(12) United States Patent
Campton et al.

(10) Patent No.: US 12,523,290 B2
(45) Date of Patent: Jan. 13, 2026

(54) ELECTRIC VEHICLE TRANSMISSION

(71) Applicant: BorgWarner Inc., Auburn Hills, MI (US)

(72) Inventors: Calahan B. Campton, Fremont, CA (US); Mohsen Behzad, Auburn Hills, MI (US)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 18/858,564

(22) PCT Filed: May 16, 2023

(86) PCT No.: PCT/US2023/022335
§ 371 (c)(1),
(2) Date: Oct. 21, 2024

(87) PCT Pub. No.: WO2023/224957
PCT Pub. Date: Nov. 23, 2023

(65) Prior Publication Data
US 2025/0271058 A1    Aug. 28, 2025

Related U.S. Application Data

(60) Provisional application No. 63/342,731, filed on May 17, 2022.

(51) Int. Cl.
*F16H 57/04*   (2010.01)
*F16H 57/031*   (2012.01)
(Continued)

(52) U.S. Cl.
CPC ....... *F16H 57/0476* (2013.01); *F16H 57/031* (2013.01); *F16H 57/037* (2013.01);
(Continued)

(58) Field of Classification Search
CPC ............ F16H 57/0476; F16H 57/0424; F16H 57/043; F16H 57/082; F16H 57/0483;
(Continued)

(56) References Cited

U.S. PATENT DOCUMENTS 5,643,127 A * 7/1997 Yoshii ................. F16H 57/0483
184/6.12
5,662,188 A   9/1997 Ito et al.
(Continued)

FOREIGN PATENT DOCUMENTS

CN    110259923 A    9/2019
DE    112013007520 B4    6/2021
(Continued)

OTHER PUBLICATIONS

Partial International Search Report for Application No. PCT/US2023/022335 dated Aug. 11, 2023, 2 pages.
(Continued)

*Primary Examiner* — Sherry L Estremsky
(74) *Attorney, Agent, or Firm* — Howard & Howard Attorneys PLLC

(57) ABSTRACT

An electric vehicle transmission for a vehicle and lubricated by an oil includes a housing extending along an axis. The housing defines a housing interior, an inlet for receiving the oil from the housing interior, an inlet for receiving the oil from the housing interior, an outlet for expelling the oil, and a passageway in fluid communication with the inlet and the outlet. The outlet is spaced radially inward from the inlet.

19 Claims, 20 Drawing Sheets

(51) Int. Cl.
*F16H 57/037* (2012.01)
*F16H 57/08* (2006.01)
*F16H 57/02* (2012.01)

(52) U.S. Cl.
CPC ....... *F16H 57/0424* (2013.01); *F16H 57/043* (2013.01); *F16H 57/045* (2013.01); *F16H 57/0471* (2013.01); *F16H 57/0483* (2013.01); *F16H 57/0486* (2013.01); *F16H 57/082* (2013.01); *F16H 2057/02034* (2013.01); *F16H 2057/02052* (2013.01); *F16H 2057/085* (2013.01)

(58) Field of Classification Search
CPC ............. F16H 57/0486; F16H 57/0471; F16H 37/082; B60K 2001/001
See application file for complete search history.

(56) References Cited

U.S. PATENT DOCUMENTS

| | | | |
|---|---|---|---|
| 7,549,940 B2 | 6/2009 | Kira et al. | |
| 8,049,384 B2 | 11/2011 | Wilton et al. | |
| 8,459,134 B2 * | 6/2013 | Harashima | F16H 57/0441 74/325 |
| 8,746,405 B2 | 6/2014 | Perakes et al. | |
| 8,968,139 B2 | 3/2015 | Fukami et al. | |
| 9,657,825 B2 | 5/2017 | Ohmura et al. | |
| 9,958,055 B2 * | 5/2018 | Iwasaki | F16H 57/0479 |
| 10,746,282 B2 | 8/2020 | Ito et al. | |
| 10,753,449 B2 | 8/2020 | Yamamoto et al. | |
| 11,114,921 B2 | 9/2021 | Ito et al. | |
| 11,168,783 B1 | 11/2021 | Cradit et al. | |
| 11,274,740 B2 | 3/2022 | Wilson et al. | |
| 11,318,834 B2 | 5/2022 | Suyama et al. | |
| 11,413,946 B2 | 8/2022 | Absenger et al. | |
| 11,421,774 B2 | 8/2022 | Tamura et al. | |
| 11,434,977 B2 | 9/2022 | Takahashi et al. | |
| 11,578,798 B2 | 2/2023 | Nakata et al. | |
| 11,649,882 B2 | 5/2023 | Asai et al. | |
| 2021/0190201 A1 | 6/2021 | Shimokobe et al. | |
| 2021/0293325 A1 | 9/2021 | Tanaka | |
| 2021/0394600 A1 | 12/2021 | Absenger et al. | |
| 2022/0099177 A1 | 3/2022 | Tamura et al. | |
| 2023/0313877 A1 * | 10/2023 | Oshidari | F16H 57/043 475/159 |
| 2024/0229920 A1 | 7/2024 | Oshidari | |

FOREIGN PATENT DOCUMENTS

| | | |
|---|---|---|
| DE | 102020132211 B3 | 5/2022 |
| JP | 5905737 B2 | 4/2016 |
| WO | 2012114847 A1 | 8/2012 |
| WO | 2015058788 A1 | 4/2015 |
| WO | 2018061443 A1 | 4/2018 |
| WO | WO-2021137287 A1 * | 7/2021 ......... F16H 57/0483 |

OTHER PUBLICATIONS

International Search Report for Application No. PCT/US2023/022332 dated Jul. 24, 2023, 3 pages.
International Search Report for Application No. PCT/US2023/022336 dated Jul. 24, 2023, 3 pages.
International Search Report for Application No. PCT/US2023/022335 dated Dec. 12, 2023, 2 pages.
English language abstract and machine-assisted English translation for CN 110259923 A extracted from espacenet. com database on Oct. 22, 2024, 17 pages.
English language abstract for DE 11 2013 007 520 B4 extracted from espacenet. com database on Oct. 22, 2024, 2 pages.
Machine-assisted English language abstract and machine-assisted English translation for DE 10 2020 132 211 B3 extracted from espacenet.com database on Oct. 22, 2024, 18 pages.
English language abstract and machine-assisted English translation for JP 5905737 B2 extracted from espacenet.com database on Oct. 22, 2024, 18 pages.
English language abstract for WO 2018/061443 A1 extracted from espacenet. com database on Oct. 22, 2024, 2 pages.
U.S. Appl. No. 18/859,748, filed Oct. 24, 2024.
U.S. Appl. No. 18/859,774, filed Oct. 24, 2024.

* cited by examiner

ELECTRIC VEHICLE TRANSMISSION

CROSS-REFERENCE TO RELATED APPLICATIONS

This application is the National Stage of International Patent Application No. PCT/US2023/022335, filed May 16, 2023, which claims priority to and all the advantages of U.S. Provisional Patent Application No. 63/342,731, filed May 17, 2022, the entire contents of which are hereby incorporated by reference.

BACKGROUND OF THE DISCLOSURE

1. Field of the Disclosure

The present invention generally relates to an electric vehicle transmission.

2. Description of the Related Art

Conventional electric vehicle transmissions of a vehicle include a housing defining a housing interior and a sump for retaining oil, an electric motor including a rotor and a stator disposed in the housing interior, a shaft disposed in the housing interior and extending along a shaft axis with the shaft being rotatably coupled to the rotor of the electric motor, and a gear reduction assembly disposed in the housing interior. The gear reduction assembly is rotatably coupled to the shaft for delivering rotational torque to wheels of the vehicle. Oil is typically distributed throughout the electric vehicle transmission from the sump through the use of at least one pump. However, typical electric vehicle transmission using at least one pump to distribute oil throughout the electric vehicle transmission require the at least one pump to be larger, which occupies space in the vehicle and increases the cost of the electric vehicle assembly.

Accordingly, there remains a need for an improved electric vehicle transmission.

SUMMARY OF THE INVENTION AND ADVANTAGES

An electric vehicle transmission for a vehicle and lubricated by an oil includes a housing extending along an axis. The housing defines a housing interior, an inlet for receiving the oil from the housing interior, an inlet for receiving the oil from the housing interior, an outlet for expelling the oil, and a passageway in fluid communication with the inlet and the outlet. The outlet is spaced radially inward from the inlet.

The outlet defined by the housing being spaced radially inward from the inlet defined by the housing allows the oil to flow from the inlet, through the passageway, and out of the outlet so that the oil is expelled at a radially inward location relative to the inlet. Because the inlet, the passageway, and the outlet are defined by the housing and the housing is stationary relative to the axis, there are no centrifugal forces on the oil which would prevent the oil from flowing radially inward toward the axis. The oil expelled from the outlet is then able to flow to lubricate the electric vehicle transmission.

BRIEF DESCRIPTION OF THE DRAWINGS

Other advantages of the present disclosure will be readily appreciated, as the same becomes better understood by reference to the following detailed description when considered in connection with the accompanying drawings.

DETAILED DESCRIPTION OF THE INVENTION

Figure 1:
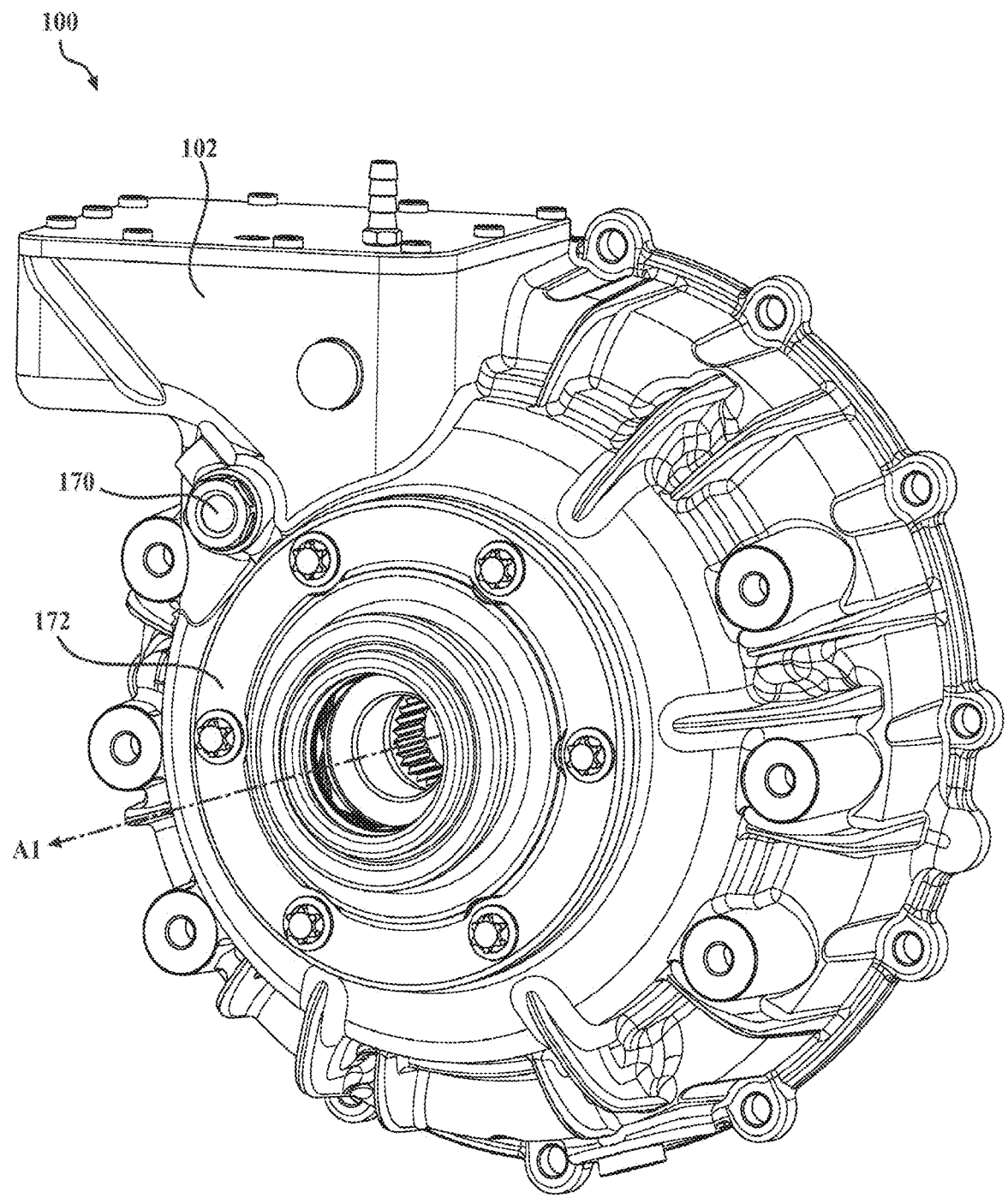
FIG. 1 is a perspective view of the electric vehicle transmission.

With reference to the Figures, wherein like numerals indicate like parts throughout the several views, an electric vehicle transmission 100 for a vehicle includes a housing 102 extending along an axis A1 and defining a housing interior 104. The electric vehicle transmission 100 is capable of being lubricated by an oil. The housing 102 defines an inlet 106 for receiving the oil from the housing interior 104, an outlet 108 for expelling the oil, and a passageway 110 in fluid communication with the inlet 106 and the outlet 108. The outlet 108 is spaced radially inwardly from the inlet 106. The housing 102 may be rotationally stationary relative to the axis A1, and the housing interior 104 may be divided into an electric motor side 112 and a gear reduction side 114.

The electric vehicle transmission 100 may also include an electric motor 116 disposed in the housing interior 104. The electric motor 116 may include a rotor 118 and a stator 120. The electric vehicle transmission 100 may include an input shaft 122 disposed in the housing interior 104 and extending along the axis A1, and the input shaft 122 may be rotatably coupled to the rotor 118 of the electric motor 116. The electric motor 116 may provide rotational torque to the input shaft 122. The electric vehicle transmission 100 may further include a first output shaft 124 spaced from the input shaft 122 along the axis A1 and a second output shaft 125 concentrically arranged within the input shaft 122. Both the first output shaft 124 and the second output shaft 125 are rotatably couplable to the input shaft 122. The electric vehicle transmission 100 may further include a differential 126 coupled to the first output shaft 124 and the second output shaft 125. The differential 126 may be supported by bushings 128.

The electric vehicle transmission 100 may include a gear reduction assembly 130 disposed within the housing interior 104 of the housing 102 and coupled to the input shaft 122 and to the first output shaft 124 to modulate transmission of torque between the input shaft 122 and the first output shaft 124. It is to be appreciated that the first output shaft 124 may be configured to deliver rotational torque to one wheel of the vehicle, and the second output shaft 125 may be configured to deliver rotational torque to another wheel of the vehicle. Although not required, it is also be appreciate that the electric vehicle transmission 100 may be situated transversely with respect to the vehicle.

The gear reduction assembly 130 may include numerous components which are configured to rotate or otherwise move relative to the axis A1 and/or relative to the housing 102. In a non-limiting example, as shown in FIGS. 2, 3, and 8-20, the gear reduction assembly 130 may be further defined as a planetary gearset 132. The planetary gearset 132 may include a plurality of pinion gears 134 disposed about the axis A1. The plurality of pinion gears 134 may be further defined as three pinion gears 134. The three pinion gears 134 may be radially separated by 120 degrees from one another about the axis A1. Each pinion gear may include a first gear section 136, a pinion shaft 138 extending from the first gear section 136 along the axis A1, and a second gear section 140 spaced from the first gear section along the axis A1.

The planetary gearset 132 may also include a plurality of needle bearings 142 and a plurality of ball bearings 144 to support rotation of the plurality of pinion gears 134. More specifically, each pinion gear 134 may be supported by a needle bearing 142 adjacent to the second gear section 140 and by a ball bearing 144 adjacent to the first gear section 136, as shown in FIGS. 9, 14, 17, and 19. Each needle bearing may include an outer ring rotationally fixed to a carrier 148 and a plurality of needles disposed in the outer ring. Each ball bearing 144 may include an inner race 150, a plurality of balls 152, and an outer race 154. The inner race 150 may be rotationally fixed relative to the pinion gear 134, and the outer race 154 may be rotationally fixed relative to the carrier 148. It is also to be appreciated that the differential 126 may be coupled to the carrier 148.

The planetary gearset 132 may also include a sun gear 156 coupled to the input shaft 122. The sun gear 156 may be disposed in meshed arrangement with the plurality of pinion gears and configured to transmit rotational torque from the input shaft 122 to the plurality of pinion gears 134. The planetary gearset 132 may also include the carrier 148 coupled to the plurality of pinion gears 134 to support the plurality of pinion gears 134. The planetary gearset 132 may also further include a ring gear 158 disposed radially about the plurality of pinion gears 134 and disposed in meshed arrangement with the plurality of pinion gears 134.

The oil lubricates various components of the gear reduction assembly 130, including but not limited to the pinion gears 134, the ball bearings 144, the needle bearings 142, the differential 126, the ring gear 158, the sun gear 156, and the carrier 148. Upon contact between the oil and the components of the gear reduction assembly 130, centrifugal forces may be imparted to the oil which may fling the oil radially outward relative to the axis A1. Some of the oil flung by the gear reduction assembly 130 contacts the housing 102 and flows through the inlet 106 defined by the housing 102. The oil which flows through the inlet 106 defined by the housing 102 continues to flow through the passageway 110 defined by the housing 102, and to the outlet 108 defined by the housing 102. It is to be appreciated that centrifugal forces are not imparted upon the oil flowing through the inlet 106, the passageway 110, and the outlet 108 by the housing 102 because the housing 102 is stationary. Thus, the inlet 106, the passageway 110, and the outlet 108 all defined by the housing 102 facilitate transfer of oil toward the axis A1 to lubricate components of the gear reduction assembly 130 without imparting centrifugal forces to the oil which would fling the oil away from the axis A1. It is to be appreciated that lubrication of components of the gear reduction assembly 130 disposed radially closer to the axis A1 thus are ensured to receive adequate lubrication.

The housing 102 of the electric vehicle transmission 100 may also define a first sump 160 for retaining oil and a second sump 162 separate from the first sump 160 for retaining oil. The second sump 162 and the first sump 160 may be configured such that oil lubricates the gear reduction assembly 130 when flowing from the first sump 160 into the first sump 160. The first sump 160 may be defined immediately adjacent to (e.g., "underneath") the gear reduction assembly 130 such that oil which has been flung radially outward relative to the axis A1 and into contact with the housing 102 then flows with the aid of gravity along the housing 102 to collect in the first sump 160. The second sump 162 may be defined within the housing 102 itself, separate from the first sump 160 and the housing interior 104, but in fluid communication with the first sump 160 and the housing interior 104. It is to be appreciated that the second sump 162 may be spaced radially outward relative to the first sump 160.

The electric vehicle transmission 100 may further include a disc 164 coupled to the gear reduction assembly 130. The disc 164 may be configured to bail oil from the first sump 160 to the second sump 162 during operation of the electric vehicle transmission 100, for example during rotation, movement, and/or operation of the gear reduction assembly 130. The disc 164 may have a circular configuration and may have one or more disc surfaces 166. The disc surface(s) 166 may have flat configuration(s) or may have elevations and/or indentations for aiding in the bailing of oil from the first sump 160 to the second sump 162 during rotation of the disc 164. Although not required, it is also to be appreciated that the disc 164 may be a component of the gear reduction assembly 130. In a non-limiting example, the disc 164 may be integrated into the carrier 148 of the planetary gearset 132 such that the disc 164 may be integral with the carrier 148 of the planetary gearset 132.

Figure 2:
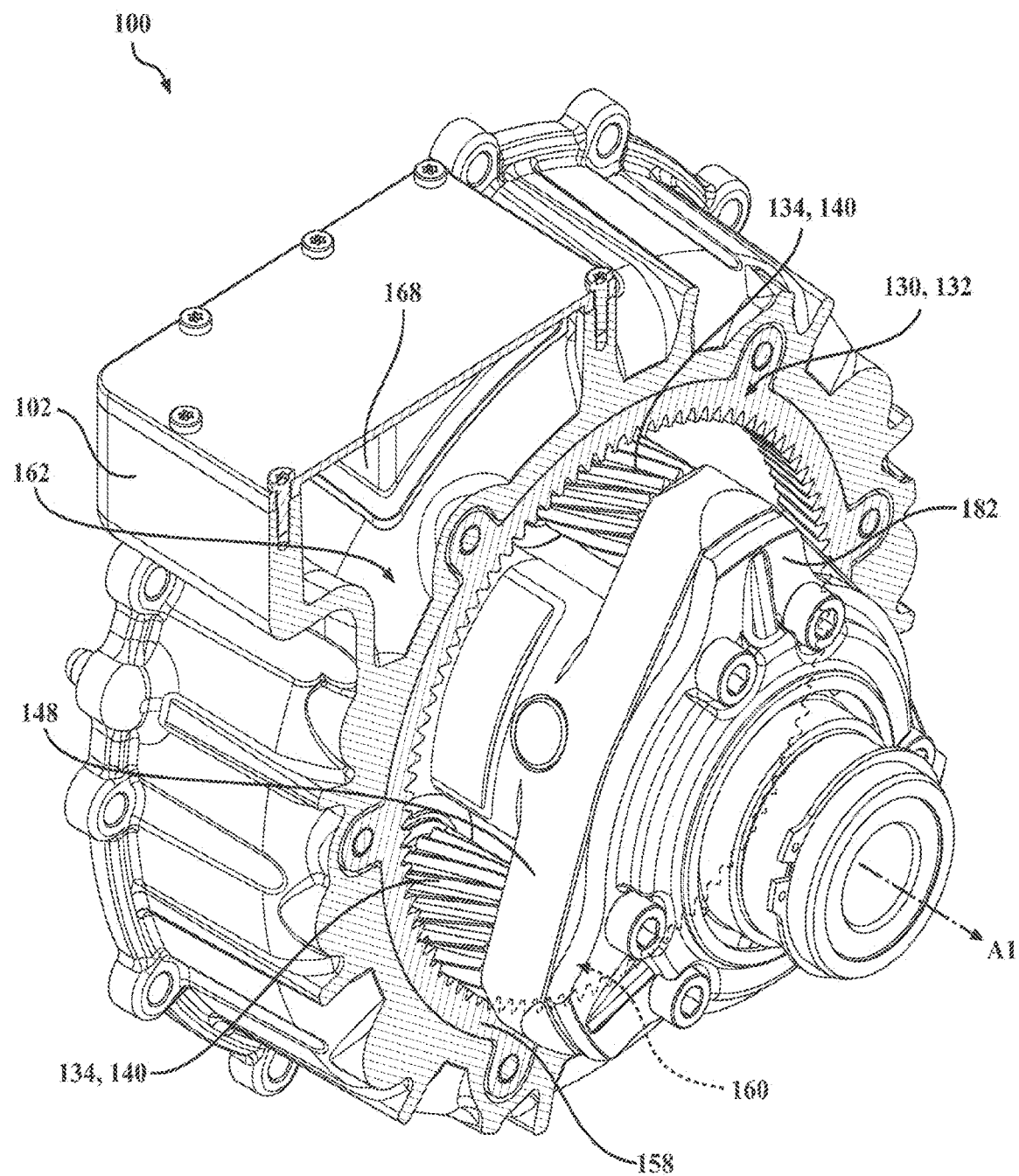
FIG. 2 is a perspective view partially in cross-section of the electric vehicle transmission of FIG. 1, with the electric vehicle transmission defining a first sump and a second sump.
Figure 3:
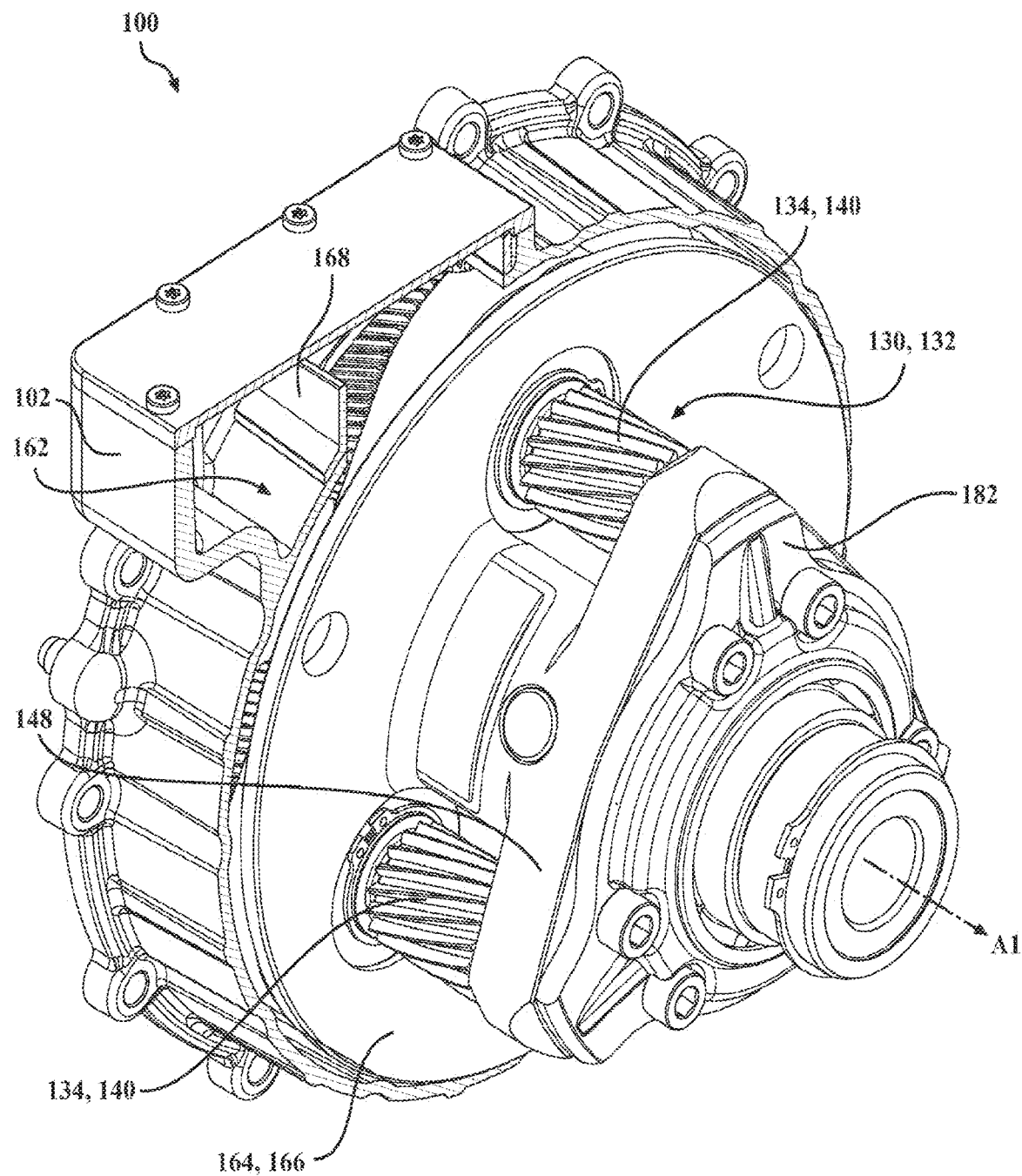
FIG. 3 is a perspective view partially in another cross-section of the electric vehicle transmission of FIG. 1, with the electric vehicle transmission including a carrier and a carrier cover coupled to the carrier.
Figure 12:
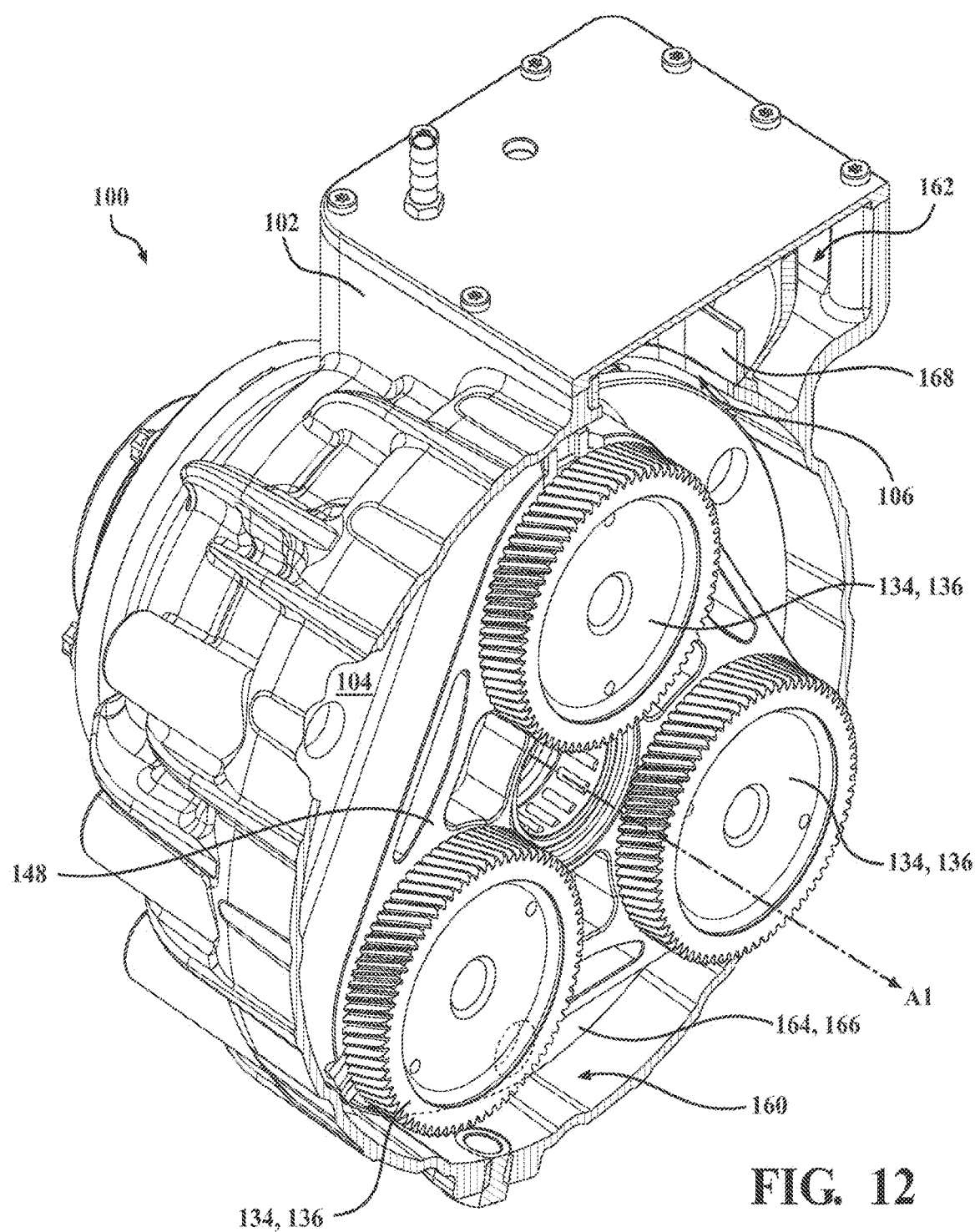
FIG. 12 is a perspective view partially in cross-section of the electric vehicle transmission of FIG. 11, with the opening defined by the housing in fluid communication with the second sump.
Figure 13:
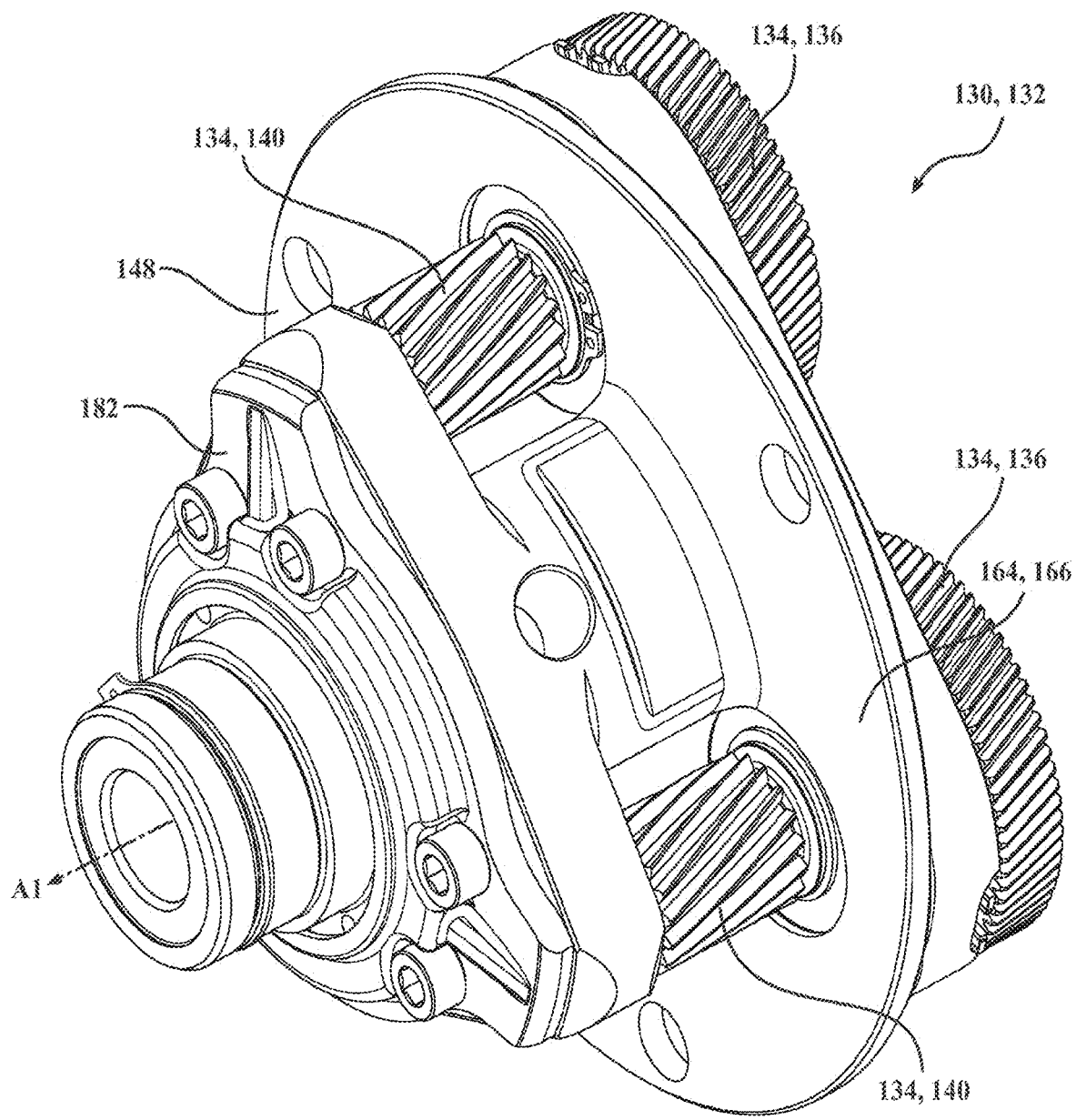
FIG. 13 is a perspective view of the carrier, the carrier cover, and the pinion gears viewed from the front of the electric vehicle transmission.
Figure 14:
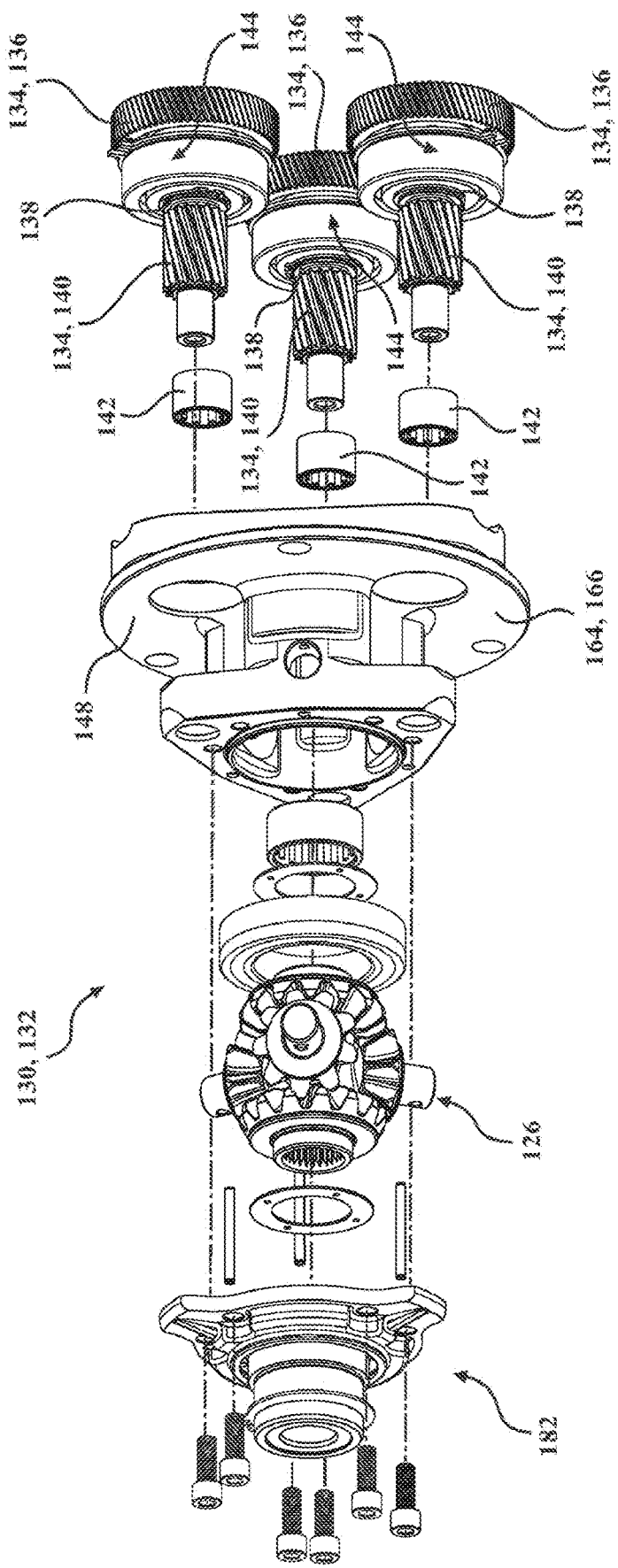
FIG. 14 is an exploded view of the carrier, the carrier cover, the pinion gears, and the differential viewed from the front of the electric vehicle transmission.

As shown in FIGS. 2, 3, and 12, the housing 102 may include a housing protrusion 168 extending into the second sump 162 for further defining the second sump 162. The housing protrusion 168 may be integral with the housing 102 or may be a separate component which is fixed, such as press into, the housing 102. The housing protrusion 168 assists in preventing oil from flowing from the second sump 162 through the inlet 106 defined by the housing 102. The housing 102 in the second sump 162 may define an upper overflow bleed orifice for allowing oil to flow between the electric motor side 112 and the gear reduction side 114. The housing 102 in the first sump 160 may define a lower overflow bleed orifice for allowing oil to flow between the electric motor side 112 and the gear reduction side 114. The electric vehicle transmission 100 may include a pump for circulating oil in the electric motor side 112 of the housing interior 104. In contrast, the electric vehicle transmission 100 may be free of a pump for circulating oil in the gear reduction side 114 of the housing interior 104. In other words, besides the disc 164, no separate mechanism for actively moving oil from the first sump 160 to the second sump 162 in the gear reduction side 114 of the housing interior 104 may be present. As such, the gear reduction side 114 of the housing interior 104 may be considered to be a low-pressure system.

Figure 4:
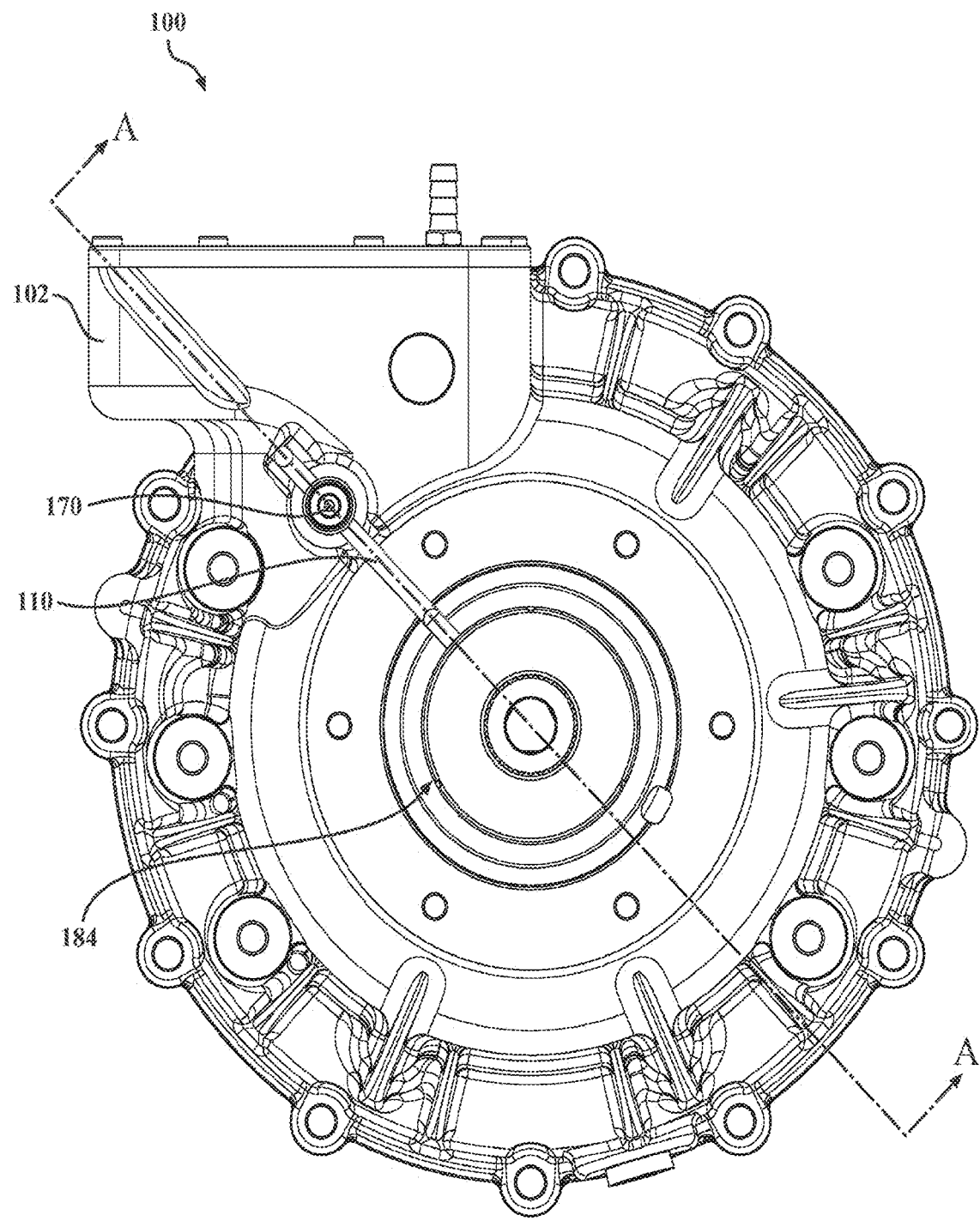
FIG. 4 is a perspective view partially in yet another cross-section of the electric vehicle transmission of FIG. 1, with the housing defining a passageway extending radially inward bisected along line A-A.
Figure 8:
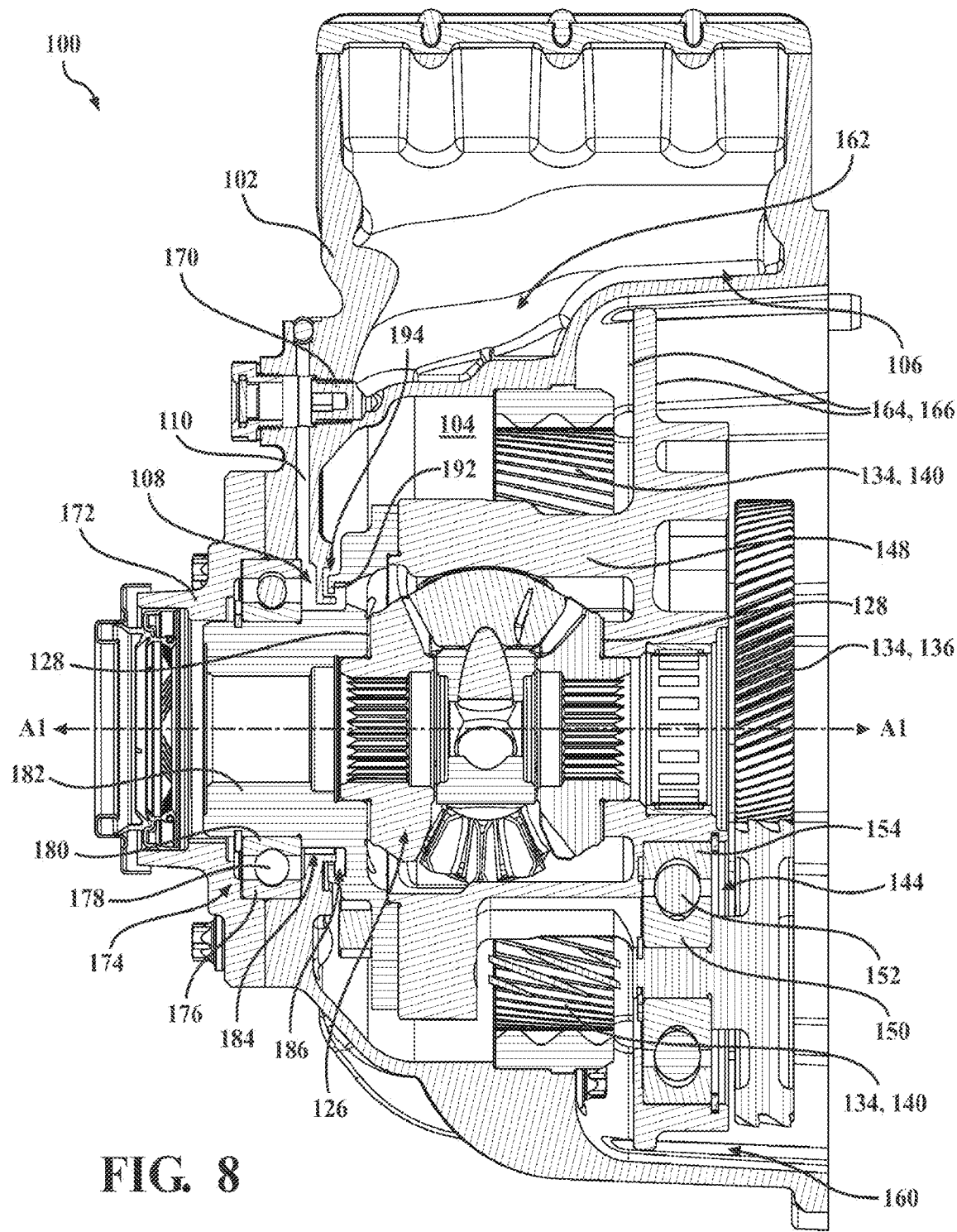
FIG. 8 is a cross-sectional view of the electric vehicle transmission taken along the general orientation indicated by line A-A in FIG. 4, with the housing defining the second sump, the passageway, the outlet, the primary feed channel, the manifold channel, and the tortuous channel.
Figure 20:
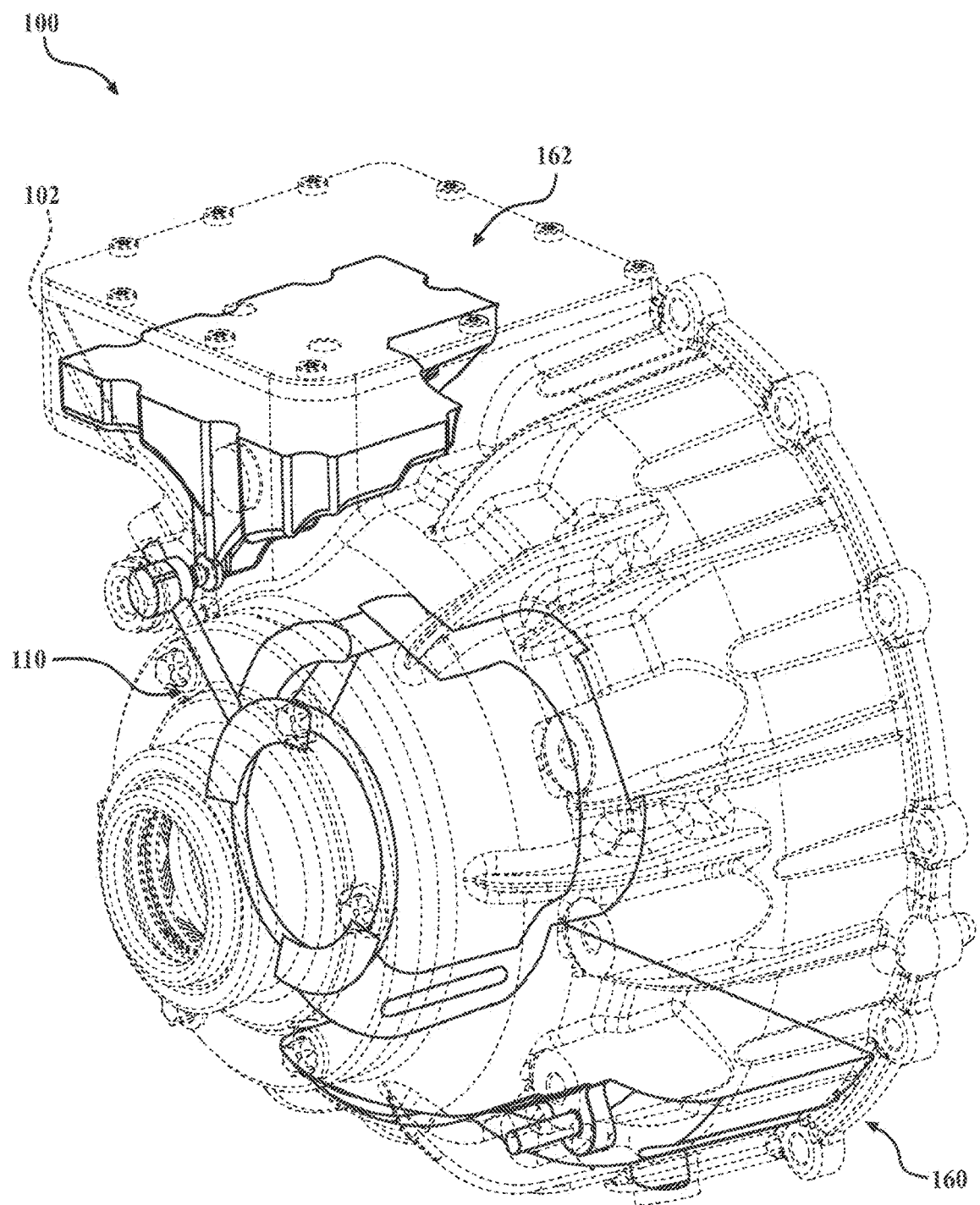
FIG. 20 is a phantom perspective view of the electric vehicle transmission, with oil in the first sump, the second sump, the passageway, the primary feed channel, the manifold channel, the first feed channel, and the second feed channel.

The inlet 106 defined by the housing 102 may be in fluid communication with the first sump 160 and the housing interior 104, from which the inlet 106 may receive oil, and the inlet 106 may be in fluid communication with the second sump 162, into which the inlet 106 may expel oil. The second sump 162 may be in fluid communication with the passageway 110, into which the second sump 162 may expel oil. The passageway 110 may be defined to extend at least partially radially inward from the second sump 162 toward the axis A1, as shown in FIGS. 4, 8, and 20. The general orientation indicated by line A-A in FIG. 4 is shown in cross-section in FIG. 8. The oil may flow from the second sump 162 through the passageway 110 with the aid of gravity. Because the passageway 110 is defined by the housing 102 and the housing 102 is stationary relative to the axis A1, there are no centrifugal forces on the oil which would prevent the oil from flowing radially inward toward the axis A1. The oil flowing through the passageway 110 then flows to lubricate various components of the gear reduction assembly 130 and back to the first sump 160.

The second sump 162 and the first sump 160 may be configured to passively control oil from flowing between the second sump 162 and the first sump 160. In a non-limiting example, as shown in FIGS. 1, 4, and 8, the electric vehicle transmission 100 may include an orifice 170 disposed between the second sump 162 and the first sump 160 for example disposed within the passageway 110, and the orifice 170 may be configured to passively regulate the flowrate of oil through the orifice 170, and thus also regulate the flowrate of oil through the passageway 110. The orifice 170 may be configured to passively regulate the flowrate of oil by defining a reduced cross-sectional flow area through which oil may flow. Alternatively, or additionally, the electric vehicle transmission 100 may include a valve disposed between the second sump 162 and the first sump 160, for example within the passageway X, and the valve may be configured to actively control oil from flowing between the second sump 162 and the first sump 160. For example, the valve may include a solenoid to open, close, or partially open/partially close the valve so that oil may flow freely, be prevented from flowing, or be partially allowed to flow through the passageway 110.

The electric vehicle transmission 100 may further include a housing cover 172 coupled to the housing 102 and a ball bearing 174 such as a single-sided shielded bearing 174 disposed within one or both of the housing 102 and the housing cover 172. The single-sided shielded bearing 174 may include an outer race 176 rotationally fixed relative to the housing 102 and/or the housing cover 172, a plurality of balls 178, and an inner race 180. The electric vehicle transmission 100 may also include a carrier cover 182 coupled to the carrier 148. More specifically, the carrier cover 182 may be rotationally fixed to the carrier 148. The inner race 180 of the single-sided shielded bearing 174 may be rotationally fixed relative to the carrier cover 182. The outlet 108 defined by the housing 102 may direct oil to lubricate the single-sided shielded bearing 174.

The outlet 108 of the housing 102 may direct oil directly to the gear reduction assembly 130. Alternatively, the outlet 108 of the housing 102 may direct the oil to flow through additional channels which more particularly direct oil to various components of the gear reduction assembly 130 which have the greatest need for lubrication. In a non-limiting example, the housing 102 adjacent to the outlet 108 and the carrier cover 182 may define a primary feed channel 184 therebetween, as shown in FIGS. 4, 8, 9, and 10. The primary feed channel 184 may be defined completely circumferentially about the axis A1 and may be defined to extend along the axis A1. The primary feed channel 184 may be in fluid communication with the outlet 108 defined by the housing 102 so that oil expelled from the outlet 108 of the housing 102 flows through the primary feed channel 184.

Figure 5:
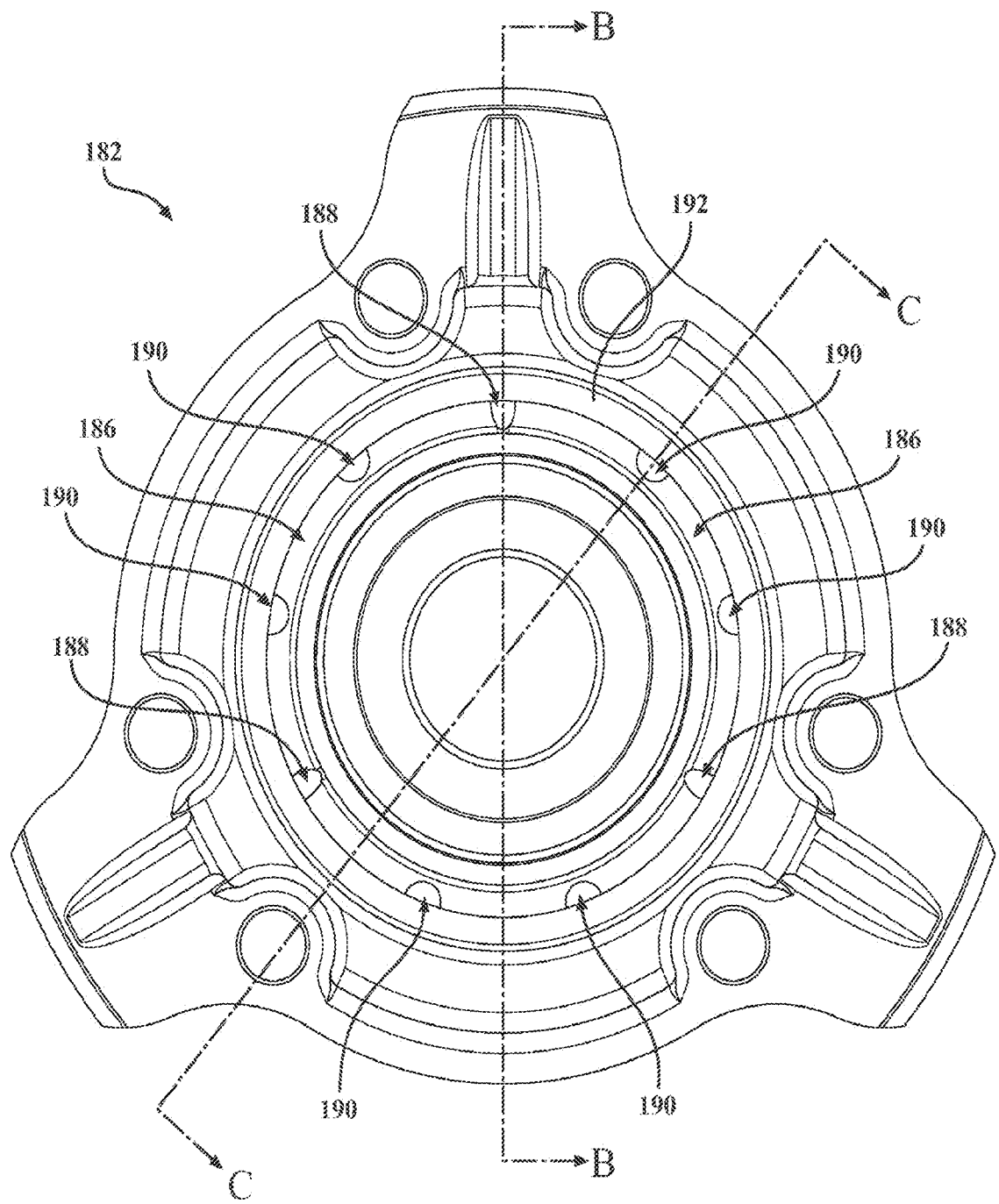
FIG. 5 is a frontal view of the carrier cover, with the carrier cover defining a manifold channel, first feed channels one of which is generally bisected along line B-B, and second feed channels one of which is generally bisected along line C-C.
Figure 6:
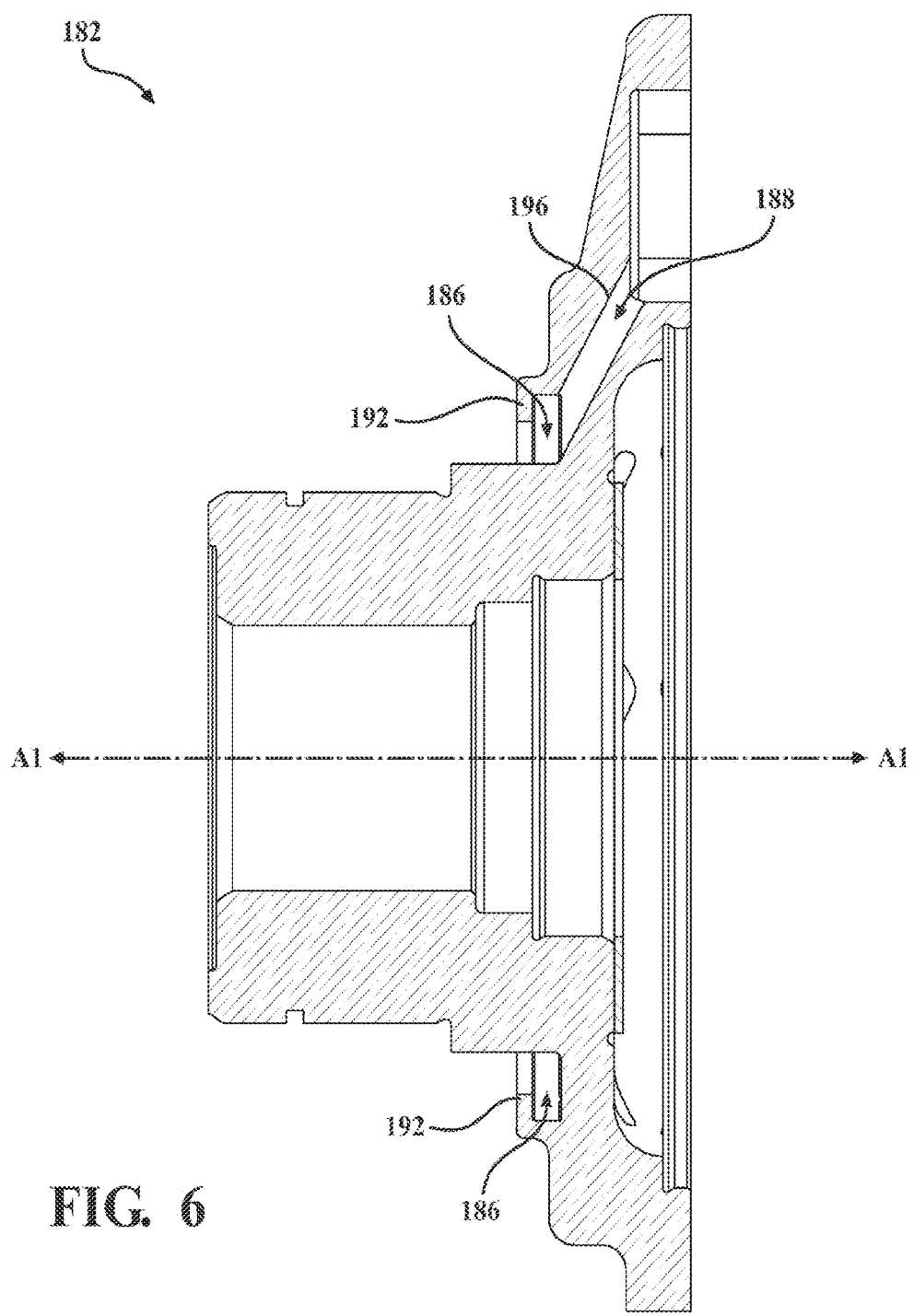
FIG. 6 is a cross-sectional view of the carrier cover taken along line B-B of FIG. 5, with one of the first feed channels shown.
Figure 7:
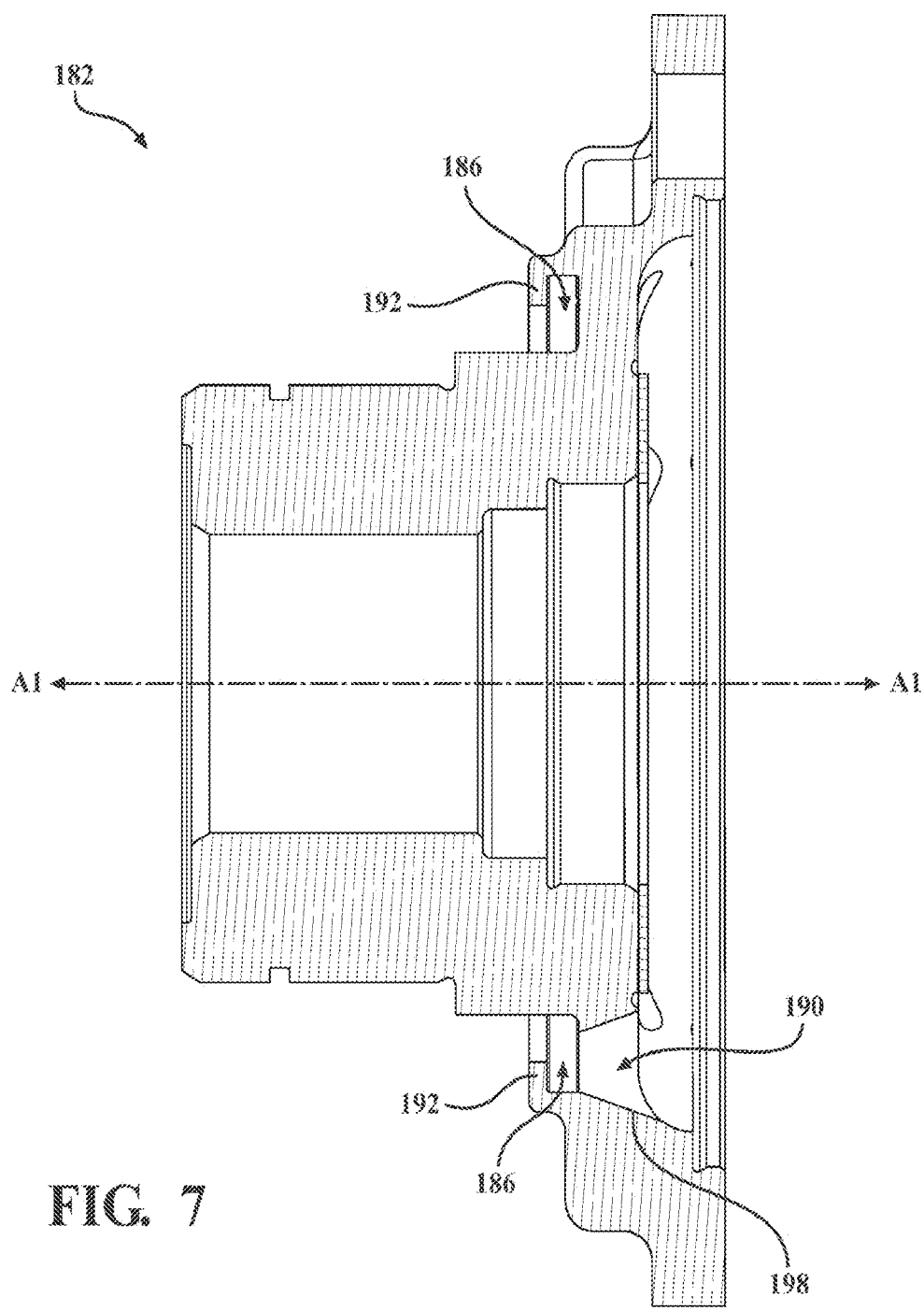
FIG. 7 is a cross-sectional view of the carrier cover taken along line C-C of FIG. 5, with one of the second feed channels shown.
Figure 9:
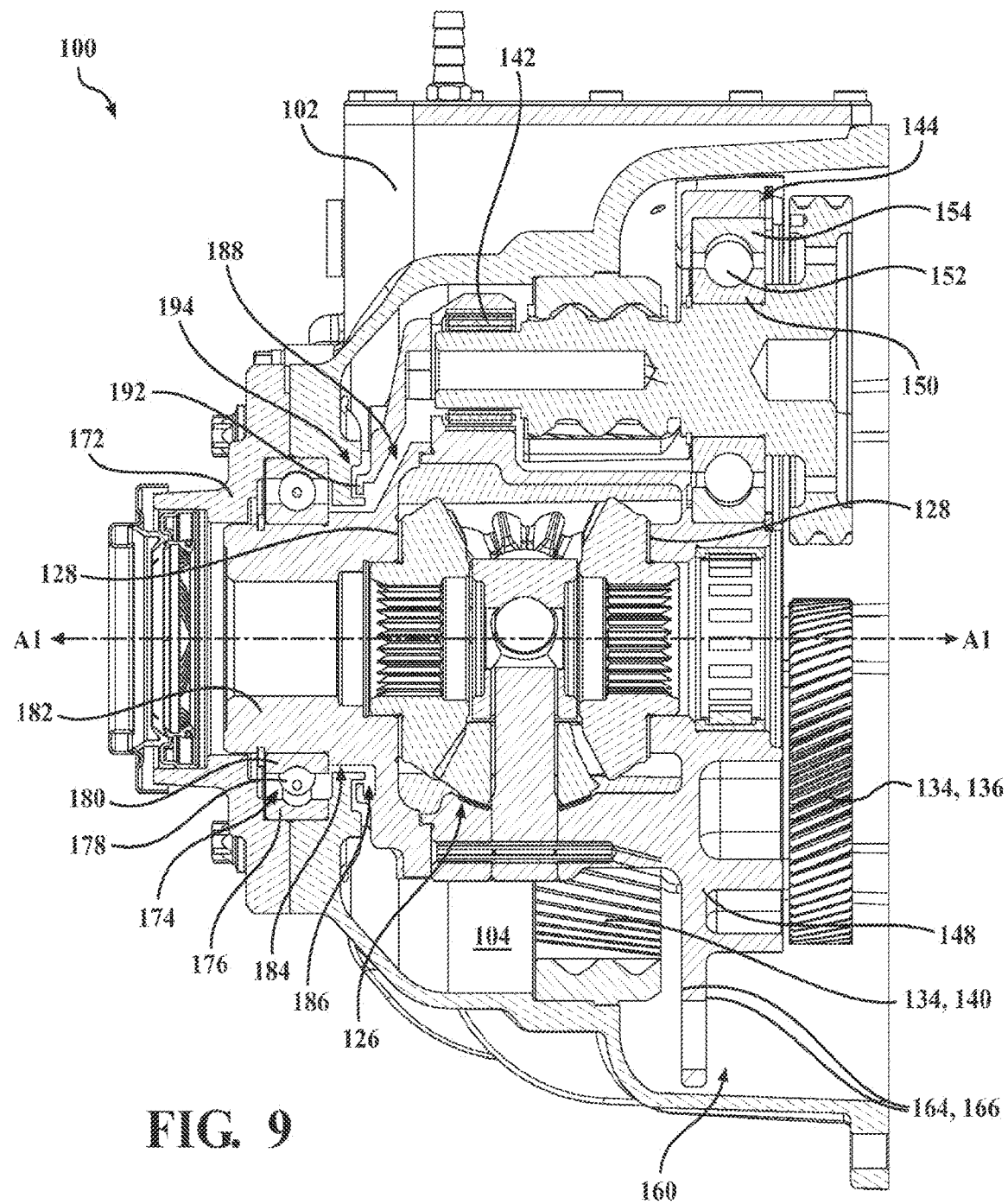
FIG. 9 is a cross-sectional view of the electric vehicle transmission taken along the general orientation indicated by line B-B in FIG. 5, with the carrier cover defining the first feed channel to direct oil toward a pinion gear and a needle bearing supporting the pinion gear.
Figure 10:
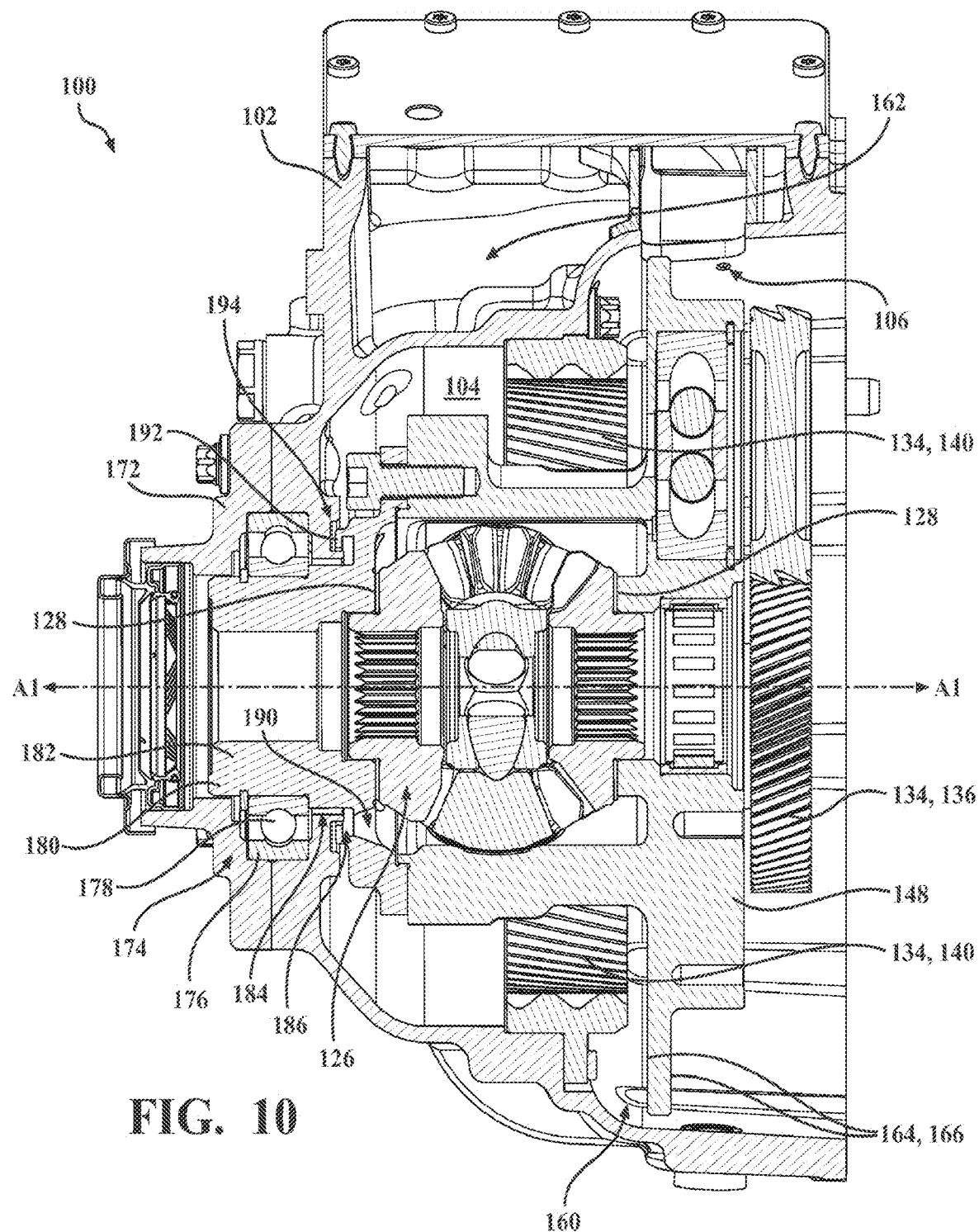
FIG. 10 is a cross-sectional view of the electric vehicle transmission taken along the general orientation indicated by line C-C in FIG. 5, with the carrier cover defining the second feed channel to direct oil toward a differential, a bushing supporting the differential, and a ball bearing supporting the pinion.
Figure 11:
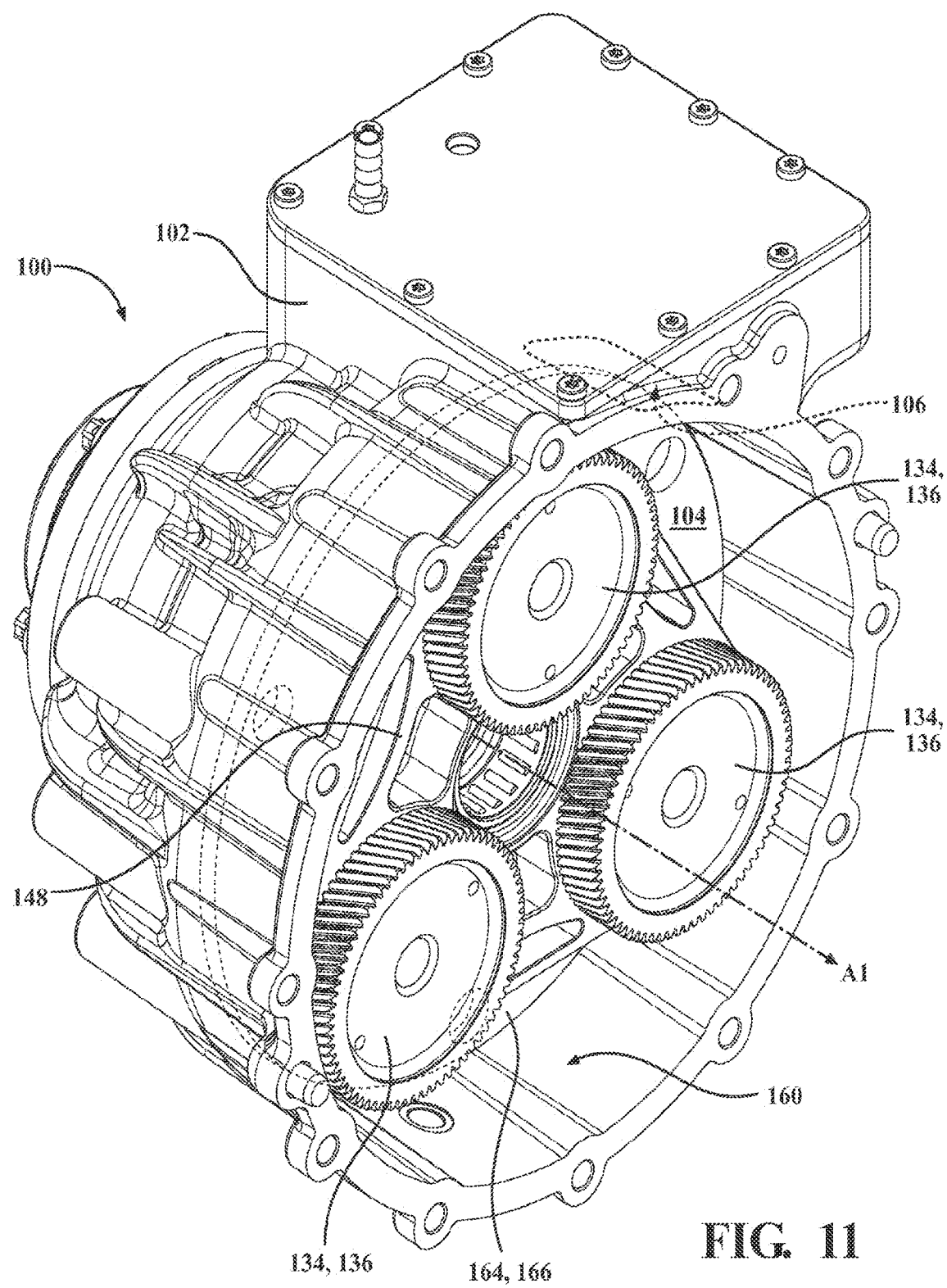
FIG. 11 is a perspective view of the electric vehicle transmission, with the electric vehicle transmission including three pinion gears.

The carrier cover 182 may define a manifold channel 186, may define a plurality of first feed channels 188, as shown in FIGS. 5, 6, and 9, and may define a plurality of second feed channels 190, as shown in FIGS. 5, 7, and 10. The manifold channel 186 may be in fluid communication with the primary feed channel 184 so that oil expelled from the primary feed channel 184 flows through the manifold channel 186. The carrier cover 182 may define the manifold channel 186 to extend completely circumferentially about the axis A1 and may define the manifold channel 186 to extend radially away from the axis A1.

It is to be appreciated that the rotating carrier cover 182 and the stationary housing 102 are prevented from contacting one another. As such, an interface between the rotating carrier cover 182 and the stationary housing 102 requires a mechanism to prevent oil from being flung radially outward toward the housing 102 due to the centrifugal forces imparted to the oil from the carrier cover 182 and, instead, directed to the various components of the gear reduction assembly 130 which have the greatest need of lubrication. To this end, the carrier cover 182 may also include a lip 192 extending radially inward, with the lip 192 partially defining the manifold channel 186. The lip 192 ensures that oil which flows into the manifold channel 186 from the primary feed channel 184 is not flung directly into contact with the housing 102, and instead is directed to either the first feed channels 188 and/or the second feed channels 190. Additionally, the interface between the rotating carrier cover 182 and the stationary housing 102 may define a tortuous path 194 to further prevent oil from being flung from the manifold channel 186 to the housing 102 without first flowing through either or both of the first feed channels 188 and the second feed channels 190. The lip 192 may partially define the tortuous path 194.

Oil which has flowed through the manifold channel 186 is directed to one or both of the first feed channels 188 and the second feed channels 190. It is to be appreciated that the first feed channels 188 and the second feed channels 190 may be at the same radial height relative to the axis A1 to prevent oil from preferentially flowing into either of the first feed channels 188 or the second feed channels 190. The general orientation of the carrier cover 182 indicated by line B-B in FIG. 5 is shown in cross-section in FIGS. 6 and 9, and the general orientation of the carrier cover 182 indicated by line C-C in FIG. 5 is shown in cross-section in FIGS. 7 and 10. As shown in FIG. 5, the first feed channels 188 may be defined radially separated by 120 degrees from one another about the axis A1, and the second feed channels 190 may be defined radially separated such that two second feed channels are defined circumferentially between adjacent pairs of first feed channels 188.

The plurality of first feed channels 188 may be further defined as three first feed channels 188. Each of the first feed channels 188 may be defined to taper 196 radially outward relative to the axis A1 such that centrifugal forces exerted on the oil will force the oil to flow radially outward along the taper 196. Each of the first feed channels 188 may be defined to direct oil from the primary feed channel 184 toward one needle bearing 142 and one pinion gear 134, more specifically toward the second gear section 140 of the pinion gear 134, thus lubricating the needle bearing 142 and the second gear section 140 of the pinion gear 134. Oil which flows through the first feed channel 188 to lubricate the needle bearing 142 and the second gear section 140 of the pinion gear 134 then flows radially outward due to centrifugal forces, contacts the housing 102, and returns to the first sump 160 with the aid of gravity.

The plurality of second feed channels 190 may be further defined as six second feed channels 190. Each of the second feed channels 190 may be defined to taper 198 radially outward relative to the axis A1 such that centrifugal forces exerted on the oil will force the oil to flow radially outward along the taper 198. Each of the second feed channels 190 may be defined to direct oil from the primary feed channel 184 toward the differential 126, and the bushings 128 supporting the differential 126, thus lubricating the differential 126 and the bushings 128 supporting the differential 126.

Figure 15:
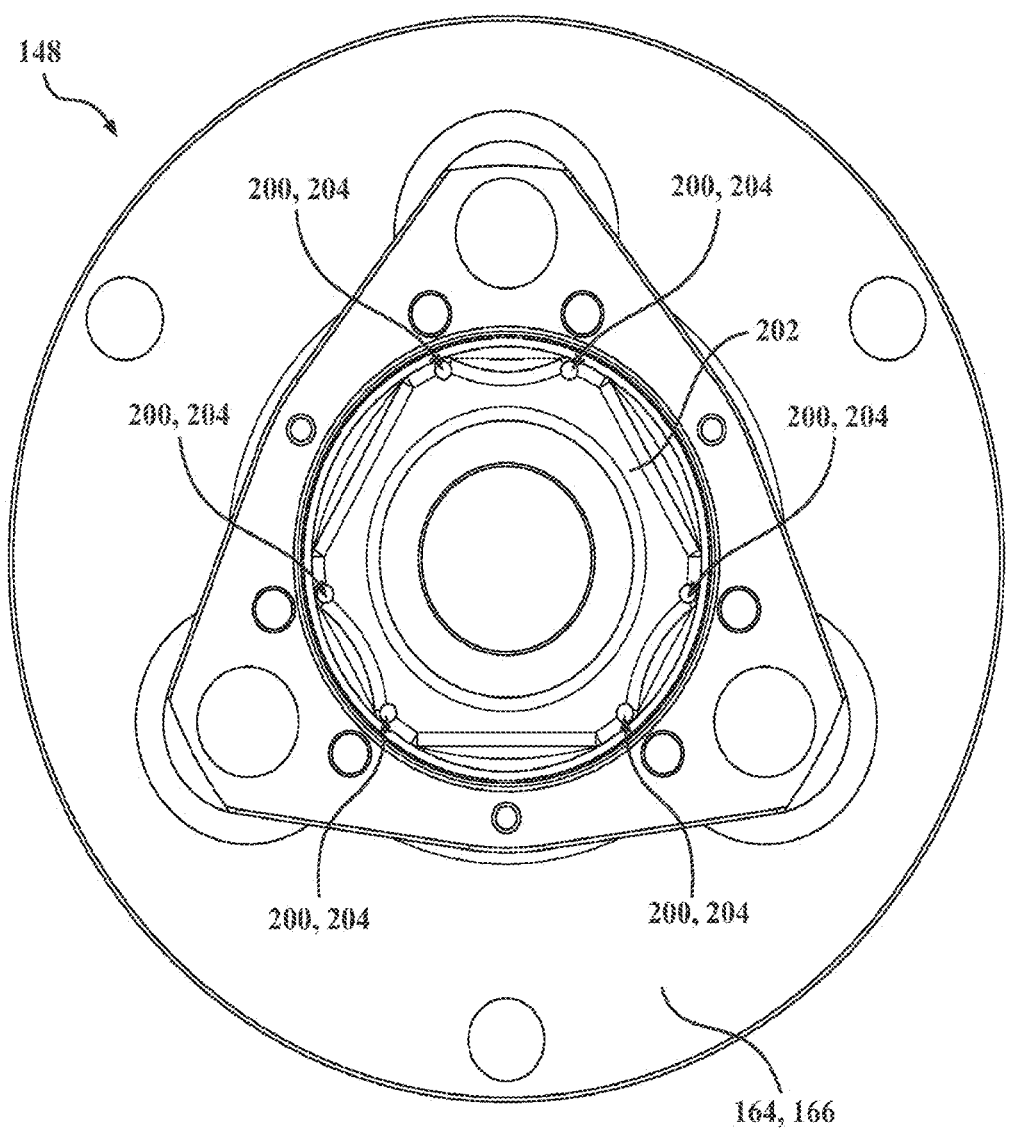
FIG. 15 is a frontal view of the carrier, with the carrier having an interior surface shaped to accommodate each pinion gear and defining openings in the radially furthest sections on either side of each pinion gear.
Figure 16:
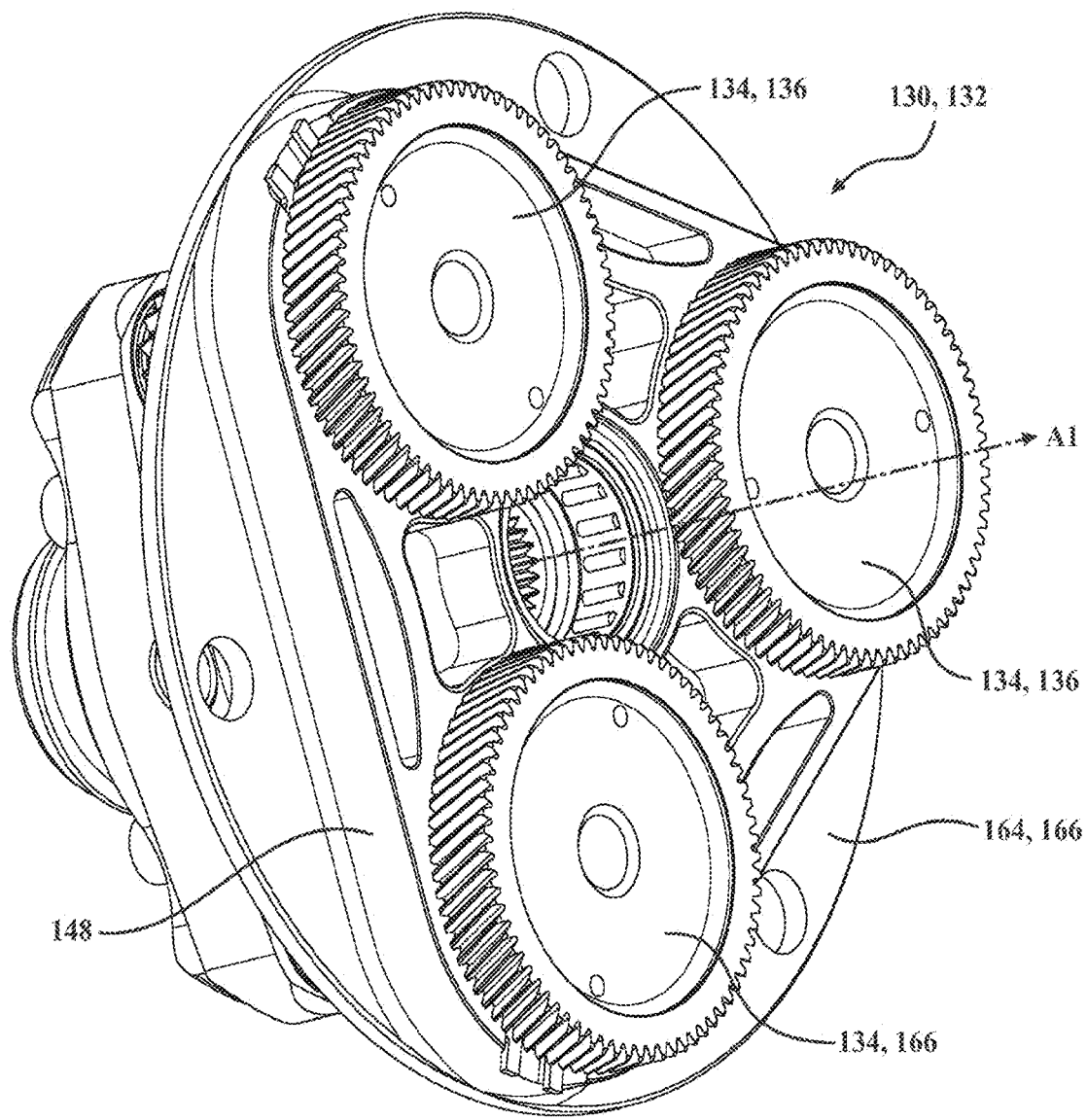
FIG. 16 is a perspective view of the carrier and the pinion gears viewed from the back of the electric vehicle transmission.
Figure 17:
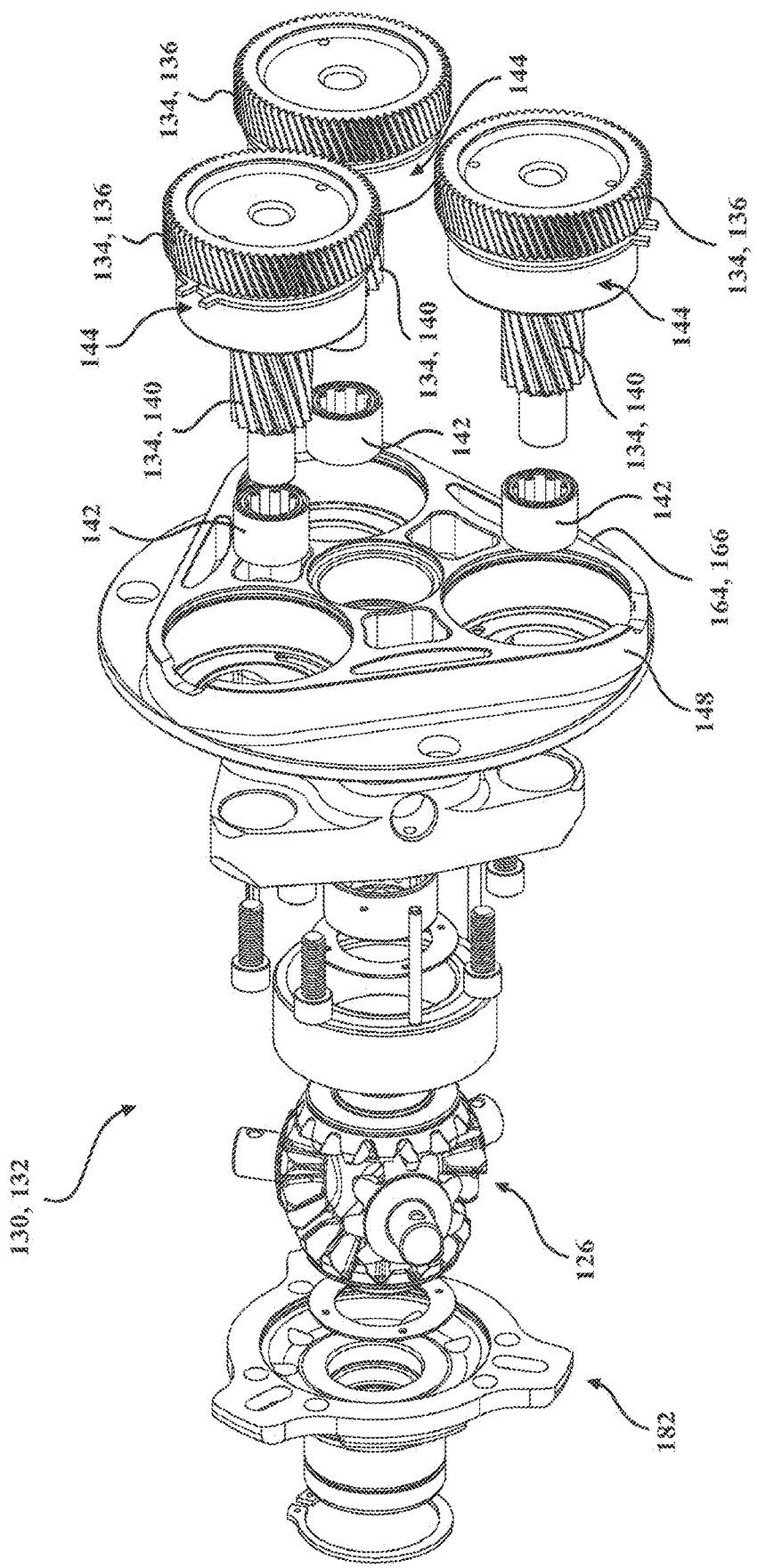
FIG. 17 is an exploded view of the carrier, the carrier cover, the pinion gears, and the differential viewed from the back of the electric vehicle transmission.
Figure 18:
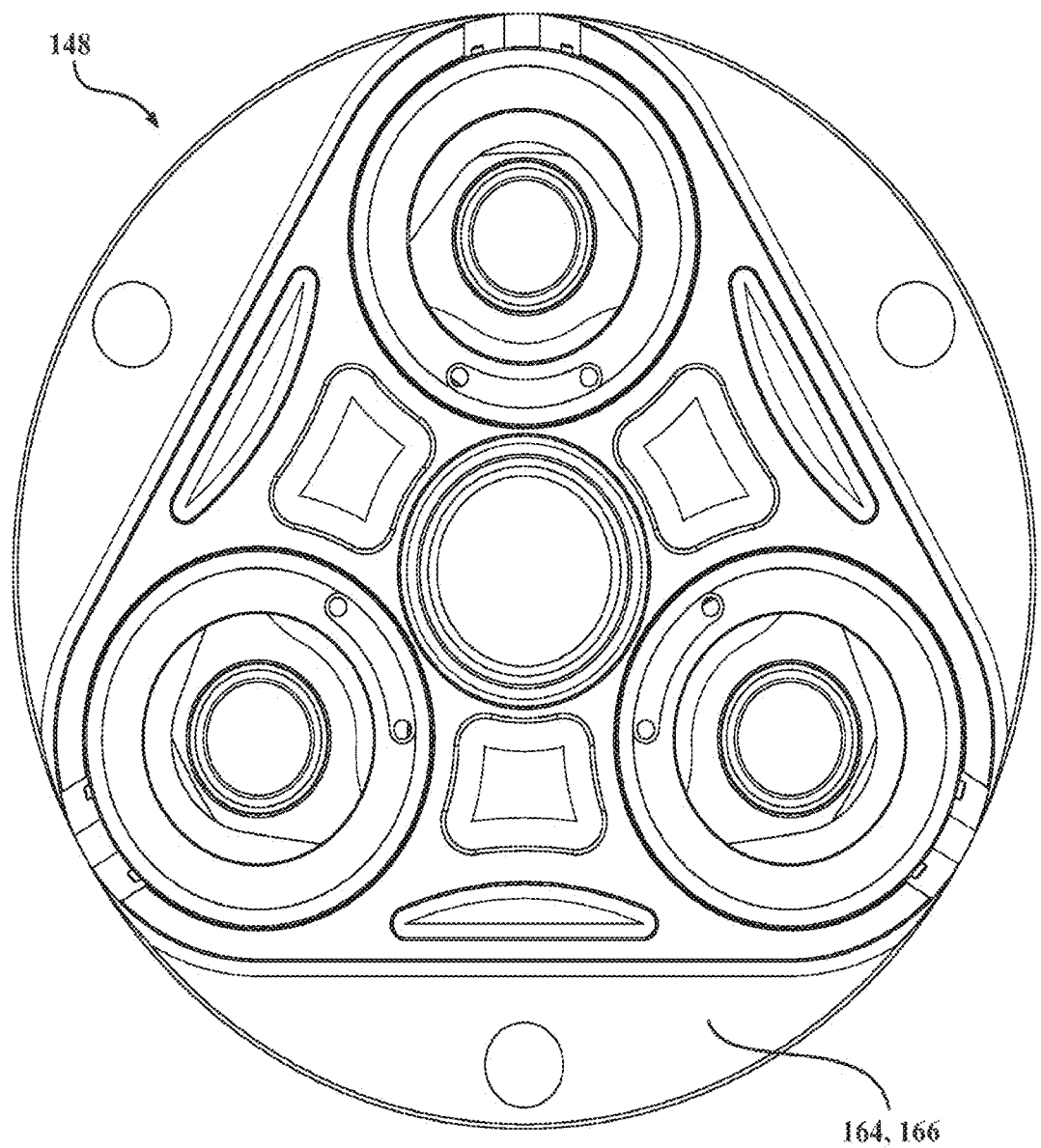
FIG. 18 is a rear view of the carrier.
Figure 19:
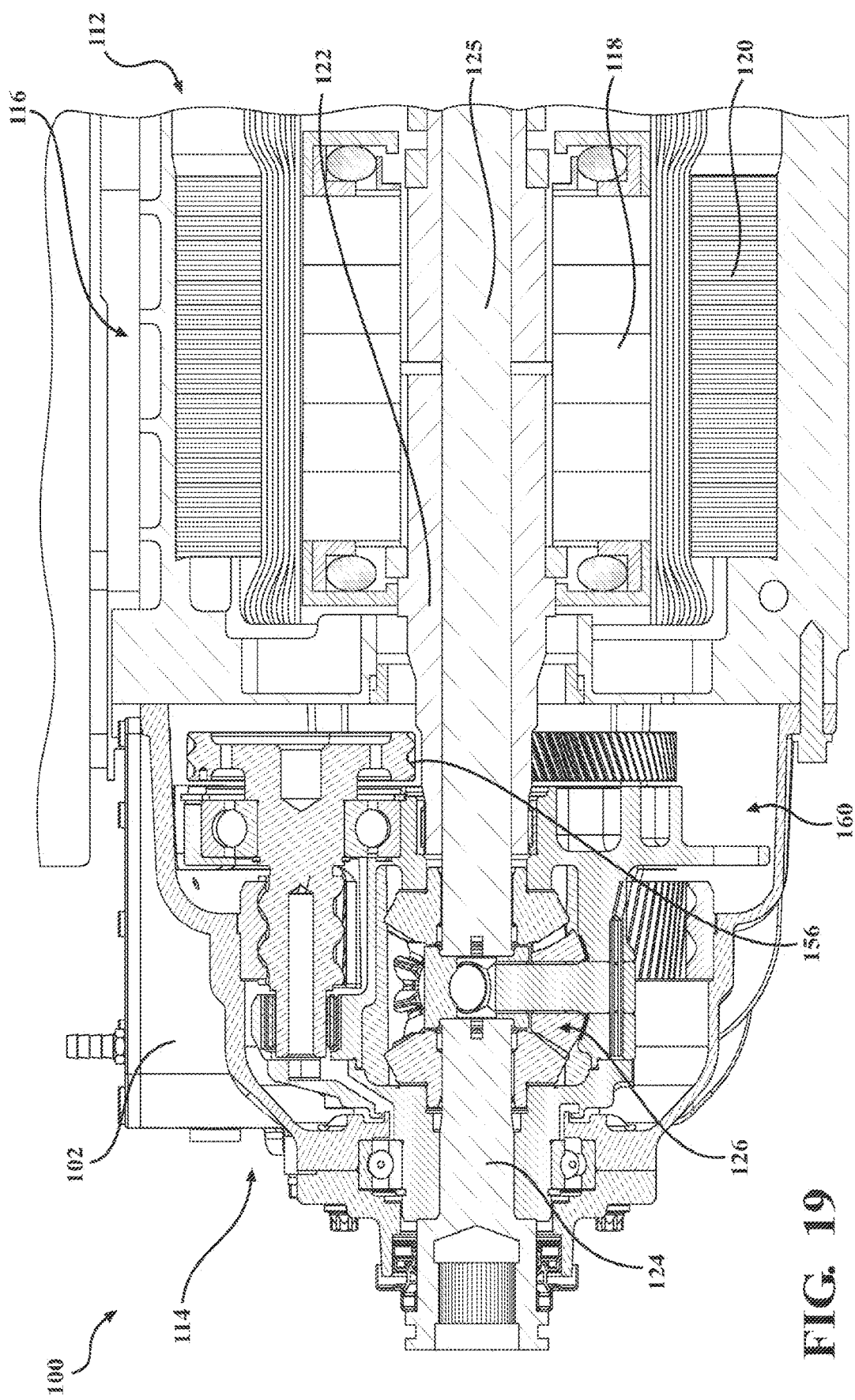
FIG. 19 is a cross-sectional view of the electric vehicle transmission, with the housing interior divided into a gear reduction side and an electric motor side, with the electric vehicle transmission including an electric motor having a rotor and a stator disposed in the electric motor side of the housing interior.

Oil which flows through the second feed channel 190 may then flow through a plurality of openings 200 defined by the carrier 148 to the ball bearings 144 supporting rotation of the pinion gears 134 to lubricate the ball bearings 144. As shown in FIG. 15, the carrier 148 may define six openings. It is to be appreciated that an interior surface 202 of the carrier 148 is shaped to accommodate each pinion gear 134. As such, on either side of each pinion gear 134, the interior surface 202 of the carrier 148 has a radially furthest section 204 from the axis A1 in which lubricant may collect due to centrifugal forces exerted on the oil. As such, the openings 200 may be defined in these radially furthest sections 204 prevent accumulation of oil within the carrier 148. Moreover, adjacent pairs of openings 200 may be fluidly connected by a bridge channel defined by the carrier 148 between adjacent pairs of openings 200. Oil which flows through the second feed channel 190 to lubricate the differential 126, bushings 128, and the ball bearings 144 then flows radially outward due to centrifugal forces, contacts the housing 102, and returns to the first sump 160 with the aid of gravity.

It is to be appreciated, therefore, that the oil flowing from the first sump 160, through the inlet 106, the second sump 162, the passageway 110, the outlet 108, the primary feed channel 184, the manifold channel 186, and either of the first feed channels 188 and the second feed channels 190 before returning to the first sump 160 largely defines a closed system for the gear reduction side 114 of the housing interior 104. However, it is also to be appreciated that some oil may be transferred between the gear reduction side 114 and the electric motor side 112 of the housing interior 104.

Embodiment 1: An electric vehicle transmission for a vehicle and lubricated by an oil, said electric vehicle transmission comprising:
    a housing extending along an axis and defining,
        a housing interior,
        an inlet for receiving the oil from said housing interior,
        an outlet for expelling the oil, and
        a passageway in fluid communication with said inlet and said outlet,
    wherein said outlet is spaced radially inwardly from said inlet.

Embodiment 2: The electric vehicle transmission as set forth in embodiment 1 further comprising an input shaft disposed in said housing interior of said housing and an electric motor disposed in said housing interior, said electric motor including a rotor rotatably coupled to said input shaft and a stator disposed about said rotor.

Embodiment 3: The electric vehicle transmission as set forth in embodiment 2 further comprising an output shaft spaced from said input shaft and a gear reduction assembly disposed in said housing interior of said housing and coupled to said input shaft and to said output shaft to modulate transmission of torque between said input shaft and said output shaft.

Embodiment 4: The electric vehicle transmission as set forth in any one of the preceding embodiments, wherein said housing further defines a first sump for retaining oil and a second sump separate from said first sump for retaining oil.

Embodiment 5: The electric vehicle transmission as set forth in embodiment 4, wherein said passageway is be defined to extend radially inward from said second sump.

Embodiment 6: The electric vehicle transmission as set forth in any one of the preceding embodiments further comprising an orifice disposed within said passageway, said orifice configured to regulate a flowrate of oil through said passageway.

Embodiment 7: The electric vehicle transmission as set forth in embodiment 1 further comprising an input shaft disposed in said housing interior, an output shaft disposed in said housing interior and spaced from said input shaft along said axis, and a gear reduction assembly disposed in said housing interior and coupled to said input shaft and said output shaft to modulate transmission of torque between said input shaft and said output shaft;

wherein said gear reduction assembly is further defined as a planetary gearset having a carrier; and wherein said electric vehicle transmission further comprises a carrier cover rotationally fixed to said carrier.

Embodiment 8: The electric vehicle transmission as set forth in embodiment 7 further comprising a housing cover coupled to said housing and a single-sided shielded bearing disposed within at least one chosen from said housing interior of said housing and said housing cover.

Embodiment 9: The electric vehicle transmission as set forth in embodiment 8, wherein said single-sided shielded bearing has an outer race fixed to at least one of said housing and said housing cover, an inner race rotationally fixed relative to said carrier cover, and a ball disposed between said outer race and said inner race.

Embodiment 10: The electric vehicle transmission as set forth in any one of embodiments 8 and 9, wherein said outlet of said housing is configured to direct oil directly to said single-sided shielded bearing.

Embodiment 11: The electric vehicle transmission as set forth in any one of embodiments 7-10, wherein said housing adjacent to said outlet and said carrier cover define a primary feed channel therebetween.

Embodiment 12: The electric vehicle transmission as set forth in embodiment 11, wherein said carrier cover defines,
a manifold channel in fluid communication with said primary feed channel,
a first feed channel in fluid communication with said manifold channel, and
a second feed channel in fluid communication with said manifold channel.

Embodiment 13: The electric vehicle transmission as set forth in embodiment 12, wherein said carrier cover includes a lip extending radially inward, with said lip partially defining said manifold channel.

Embodiment 14: The electric vehicle transmission as set forth in embodiment 13, wherein a tortuous path is defined at an interface between said carrier cover and said housing to prevent oil from being flung from said manifold channel to said housing without first flowing through either or both of said first feed channel and said second feed channel.

Embodiment 15: The electric vehicle transmission as set forth in embodiment 14, wherein said lip at least partially defines said tortuous path.

Embodiment 16: The electric vehicle transmission as set forth in any one of embodiments 12-15, wherein said first feed channel and said second feed channel are at the same radial height relative to said axis.

Embodiment 17: The electric vehicle transmission as set forth in any one of embodiments 12-16, wherein said first feed channel is further defined as a plurality of first feed channels separated by 120 degrees from one another about said axis.

Embodiment 18: The electric vehicle transmission as set forth in embodiment 17, wherein said second feed channel is further defined as a plurality of second feed channels that are defined radially separated such that two second feed channels are defined circumferentially between adjacent pairs of first feed channels.

Embodiment 19: The electric vehicle transmission as set forth in any one of embodiments 12-18, wherein said first feed channels are defined to taper radially outward relative to said axis.

Embodiment 20: The electric vehicle transmission as set forth in any one of embodiments 12-19, wherein said second feed channels are defined to taper radially outward relative to said axis.

Embodiment 21: The electric vehicle transmission as set forth in any one of embodiments 12-20, wherein said planetary gearset further comprises a plurality of pinion gears coupled to said carrier, each of said plurality of pinion gears supported by a needle bearing, and wherein said first feed channel is defined to direct oil from said manifold channel toward said needle bearing and said pinion gear.

Embodiment 22: The electric vehicle transmission as set forth in any one of embodiments 12-21 further comprising a differential disposed in said housing interior of said housing, wherein said second feed channel is defined to direct oil from said manifold channel toward said differential.

Embodiment 23: The electric vehicle transmission as set forth in embodiment 22 further comprising a plurality of ball bearings supporting rotation of said plurality of pinion gears, wherein said carrier defines a plurality of openings, and wherein said second feed channel is configured to direct oil through said plurality of openings toward said plurality of ball bearings.

Embodiment 24: The electric vehicle transmission as set forth in embodiment 23, wherein said carrier has an interior surface shaped to accommodate each pinion gear, wherein said interior surface has a plurality of radially furthest sections from said axis on either side of each pinion gear, and wherein said openings are defined in said radially furthest sections.

Embodiment 25: The electric vehicle transmission as set forth in embodiment 24, wherein adjacent pairs of openings are fluidly connected by a bridge channel defined said carrier between adjacent pairs of openings.

What is claimed is:

1. An electric vehicle transmission for a vehicle and lubricated by an oil, said electric vehicle transmission comprising:
a housing extending along an axis and defining,
a housing interior,
an inlet for receiving the oil from said housing interior,
an outlet for expelling the oil, and
a passageway in fluid communication with said inlet and said outlet,
wherein said outlet is spaced radially inwardly from said inlet;
an input shaft disposed in said housing interior;
an output shaft disposed in said housing interior and spaced from said input shaft along said axis;
a gear reduction assembly disposed in said housing interior and coupled to said input shaft and said output shaft to modulate transmission of torque between said input shaft and said output shaft, wherein said gear reduction assembly is further defined as a planetary gearset having a carrier; and
a carrier cover rotationally fixed to said carrier;
wherein said carrier cover and said housing adjacent to said outlet define a primary feed channel therebetween;
wherein said carrier cover defines a manifold channel in fluid communication with said primary feed channel, a first feed channel in fluid communication with said manifold channel, and a second feed channel in fluid communication with said manifold channel;

wherein said planetary gearset further comprises a plurality of pinion gears coupled to said carrier, each of said plurality of pinion gears supported by a needle bearing, and wherein said first feed channel is defined to direct oil from said manifold channel toward said needle bearing and said pinion gear; and wherein said electric vehicle transmission further comprises a plurality of ball bearings supporting rotation of said plurality of pinion gears, wherein said carrier defines a plurality of openings, and wherein said second feed channel is configured to direct oil through said plurality of openings toward said plurality of ball bearings.

2. The electric vehicle transmission as set forth in claim 1, wherein said housing further defines a first sump for retaining oil and a second sump separate from said first sump for retaining oil.

3. The electric vehicle transmission as set forth in claim 2, wherein said passageway is defined to extend radially inward from said second sump.

4. The electric vehicle transmission as set forth in claim 1, wherein said first feed channel and said second feed channel are at the same radial height relative to said axis.

5. The electric vehicle transmission as set forth in claim 1, wherein said first feed channel is further defined as a plurality of first feed channels separated by 120 degrees from one another about said axis.

6. The electric vehicle transmission as set forth in claim 5, wherein said second feed channel is further defined as a plurality of second feed channels that are defined radially separated such that two second feed channels are defined circumferentially between adjacent pairs of first feed channels.

7. The electric vehicle transmission as set forth in claim 1 wherein said first feed channels are defined to taper radially outward relative to said axis.

8. The electric vehicle transmission as set forth in claim 1, wherein said second feed channels are defined to taper radially outward relative to said axis.

9. The electric vehicle transmission as set forth in claim 1 further comprising a differential disposed in said housing interior of said housing, wherein said second feed channel is defined to direct oil from said manifold channel toward said differential.

10. The electric vehicle transmission as set forth in claim 1, wherein said carrier has an interior surface shaped to accommodate each pinion gear, wherein said interior surface has a plurality of radially furthest sections from said axis on either side of each pinion gear, and wherein said openings are defined in said radially furthest sections.

11. The electric vehicle transmission as set forth in claim 10, wherein adjacent pairs of openings are fluidly connected by a bridge channel defined by said carrier between adjacent pairs of openings.

12. An electric vehicle transmission for a vehicle and lubricated by an oil, said electric vehicle transmission comprising:

a housing extending along an axis and defining,
a housing interior,
an inlet for receiving the oil from said housing interior,
an outlet for expelling the oil, and
a passageway in fluid communication with said inlet and said outlet,
wherein said outlet is spaced radially inwardly from said inlet;
an input shaft disposed in said housing interior;
an output shaft disposed in said housing interior and spaced from said input shaft along said axis;
a gear reduction assembly disposed in said housing interior and coupled to said input shaft and said output shaft to modulate transmission of torque between said input shaft and said output shaft, wherein said gear reduction assembly is further defined as a planetary gearset having a carrier; and
a carrier cover rotationally fixed to said carrier;
wherein said carrier cover and said housing adjacent to said outlet define a primary feed channel therebetween;
wherein said carrier cover defines a manifold channel in fluid communication with said primary feed channel, a first feed channel in fluid communication with said manifold channel, and a second feed channel in fluid communication with said manifold channel; and
wherein said electric vehicle transmission further comprises an orifice disposed within said passageway, said orifice configured to regulate a flowrate of oil through said passageway.

13. An electric vehicle transmission for a vehicle and lubricated by an oil, said electric vehicle transmission comprising:

a housing extending along an axis and defining,
a housing interior,
an inlet for receiving the oil from said housing interior,
an outlet for expelling the oil, and
a passageway in fluid communication with said inlet and said outlet,
wherein said outlet is spaced radially inwardly from said inlet;
an input shaft disposed in said housing interior;
an output shaft disposed in said housing interior and spaced from said input shaft along said axis;
a gear reduction assembly disposed in said housing interior and coupled to said input shaft and said output shaft to modulate transmission of torque between said input shaft and said output shaft, wherein said gear reduction assembly is further defined as a planetary gearset having a carrier; and
a carrier cover rotationally fixed to said carrier;
wherein said carrier cover and said housing adjacent to said outlet define a primary feed channel therebetween;
wherein said carrier cover defines a manifold channel in fluid communication with said primary feed channel, a first feed channel in fluid communication with said manifold channel, and a second feed channel in fluid communication with said manifold channel; and
wherein said electric vehicle transmission further comprises a housing cover coupled to said housing and a ball bearing disposed within at least one chosen from said housing interior of said housing and said housing cover.

14. The electric vehicle transmission as set forth in claim 13, wherein said ball bearing has an outer race fixed to at least one of said housing and said housing cover, an inner race rotationally fixed relative to said carrier cover, and a ball disposed between said outer race and said inner race.

15. The electric vehicle transmission as set forth in claim 13, wherein said outlet of said housing is configured to direct oil directly to said ball bearing.

16. An electric vehicle transmission for a vehicle and lubricated by an oil, said electric vehicle transmission comprising:

a housing extending along an axis and defining,
a housing interior, an inlet for receiving the oil from said housing interior,
an outlet for expelling the oil, and
a passageway in fluid communication with said inlet and said outlet,
wherein said outlet is spaced radially inwardly from said inlet;

an input shaft disposed in said housing interior;

an output shaft disposed in said housing interior and spaced from said input shaft along said axis;

a gear reduction assembly disposed in said housing interior and coupled to said input shaft and said output shaft to modulate transmission of torque between said input shaft and said output shaft, wherein said gear reduction assembly is further defined as a planetary gearset having a carrier; and a carrier cover rotationally fixed to said carrier;

wherein said carrier cover and said housing adjacent to said outlet define a primary feed channel therebetween;

wherein said carrier cover defines a manifold channel in fluid communication with said primary feed channel, a first feed channel in fluid communication with said manifold channel, and a second feed channel in fluid communication with said manifold channel; and wherein said first feed channels are defined to taper radially outward relative to said axis.

17. An electric vehicle transmission for a vehicle and lubricated by an oil, said electric vehicle transmission comprising:

a housing extending along an axis and defining,
a housing interior,
an inlet for receiving the oil from said housing interior,
an outlet for expelling the oil, and
a passageway in fluid communication with said inlet and said outlet,
wherein said outlet is spaced radially inwardly from said inlet;

an input shaft disposed in said housing interior;

an output shaft disposed in said housing interior and spaced from said input shaft along said axis;

a gear reduction assembly disposed in said housing interior and coupled to said input shaft and said output shaft to modulate transmission of torque between said input shaft and said output shaft, wherein said gear reduction assembly is further defined as a planetary gearset having a carrier; and a carrier cover rotationally fixed to said carrier;

wherein said carrier cover and said housing adjacent to said outlet define a primary feed channel therebetween;

wherein said carrier cover defines a manifold channel in fluid communication with said primary feed channel, a first feed channel in fluid communication with said manifold channel, and a second feed channel in fluid communication with said manifold channel; and wherein said second feed channels are defined to taper radially outward relative to said axis.

18. An electric vehicle transmission for a vehicle and lubricated by an oil, said electric vehicle transmission comprising:

a housing extending along an axis and defining,
a housing interior,
an inlet for receiving the oil from said housing interior,
an outlet for expelling the oil, and
a passageway in fluid communication with said inlet and said outlet,
wherein said outlet is spaced radially inwardly from said inlet;

an input shaft disposed in said housing interior;

an output shaft disposed in said housing interior and spaced from said input shaft along said axis;

a gear reduction assembly disposed in said housing interior and coupled to said input shaft and said output shaft to modulate transmission of torque between said input shaft and said output shaft, wherein said gear reduction assembly is further defined as a planetary gearset having a carrier; and a carrier cover rotationally fixed to said carrier;

wherein said carrier cover and said housing adjacent to said outlet define a primary feed channel therebetween;

wherein said carrier cover defines a manifold channel in fluid communication with said primary feed channel, a first feed channel in fluid communication with said manifold channel, and a second feed channel in fluid communication with said manifold channel;

wherein said carrier cover includes a lip extending radially inward, with said lip partially defining said manifold channel; and wherein a tortuous path is defined at an interface between said carrier cover and said housing to prevent oil from being flung from said manifold channel to said housing without first flowing through either or both of said first feed channel and said second feed channel.

19. The electric vehicle transmission as set forth in claim 18, wherein said lip at least partially defines said tortuous path.

* * * * *